United States Patent
Laffargue

(10) Patent No.: US 9,080,856 B2
(45) Date of Patent: Jul. 14, 2015

(54) SYSTEMS AND METHODS FOR ENHANCING DIMENSIONING, FOR EXAMPLE VOLUME DIMENSIONING

(71) Applicant: Intermec IP Corp., Everett, WA (US)

(72) Inventor: Franck Laffargue, Toulouse (FR)

(73) Assignee: Intermec IP Corp., Fort Mill, SC (US)

( * ) Notice: Subject to any disclaimer, the term of this patent is extended or adjusted under 35 U.S.C. 154(b) by 302 days.

(21) Appl. No.: 13/799,762

(22) Filed: Mar. 13, 2013

(65) Prior Publication Data

US 2014/0267609 A1    Sep. 18, 2014

(51) Int. Cl.
| | |
|---|---|
| H04N 13/02 | (2006.01) |
| G06T 17/00 | (2006.01) |
| G06K 9/00 | (2006.01) |
| G01B 11/00 | (2006.01) |
| G06K 9/62 | (2006.01) |
| G06T 7/00 | (2006.01) |
| G06T 7/60 | (2006.01) |

(52) U.S. Cl.
CPC ............ G01B 11/002 (2013.01); G06K 9/6211 (2013.01); G06T 7/0057 (2013.01); G06T 7/60 (2013.01); *G06K 2209/19* (2013.01); *G06K 2209/401* (2013.01)

(58) Field of Classification Search
CPC ..... G01B 11/002; G01B 11/2513; H04N 7/18
USPC ............... 348/46; 345/420; 382/154
See application file for complete search history.

(56) References Cited

U.S. PATENT DOCUMENTS

| | | | |
|---|---|---|---|
| 3,971,065 | A | 7/1976 | Bayer |
| 4,398,811 | A | 8/1983 | Nishioka et al. |
| 4,730,190 | A | 3/1988 | Win et al. |
| 5,220,536 | A | 6/1993 | Stringer et al. |
| 5,331,118 | A | 7/1994 | Jensen |
| 5,359,185 | A | 10/1994 | Hanson |

(Continued)

FOREIGN PATENT DOCUMENTS

| | | |
|---|---|---|
| DE | 10210813 A1 | 10/2003 |
| DE | 102007037282 A1 | 3/2008 |

(Continued)

OTHER PUBLICATIONS

U.S. Appl. No. 13/367,978, filed Feb. 7, 2012, (Feng et al.); now abandoned.

(Continued)

*Primary Examiner* — Dave Czekaj
*Assistant Examiner* — Tsion B Owens
(74) *Attorney, Agent, or Firm* — Additon, Higgins & Pendleton, P.A.

(57) ABSTRACT

A dimensioning system can include stored data indicative of coordinate locations of each reference element in a reference image containing a pseudorandom pattern of elements. Data indicative of the coordinates of elements appearing in an acquired image of a three-dimensional space including an object can be compared to the stored data indicative of coordinate locations of each reference element. After the elements in the acquired image corresponding to the reference elements in the reference image are identified, a spatial correlation between the acquired image and the reference image can be determined. Such a numerical comparison of coordinate data reduces the computing resource requirements of graphical comparison technologies.

29 Claims, 11 Drawing Sheets

(56) References Cited

U.S. PATENT DOCUMENTS

| | | |
|---|---|---|
| 5,548,707 A | 8/1996 | LoNegro |
| 5,555,090 A | 9/1996 | Schmutz |
| 5,590,060 A | 12/1996 | Granville et al. |
| 5,655,095 A | 8/1997 | LoNegro et al. |
| 5,661,561 A | 8/1997 | Wurz et al. |
| 5,699,161 A | 12/1997 | Woodworth |
| 5,729,750 A | 3/1998 | Ishida |
| 5,734,476 A | 3/1998 | Dlugos |
| 5,831,737 A | 11/1998 | Stringer et al. |
| 5,850,370 A | 12/1998 | Stringer et al. |
| 5,869,827 A | 2/1999 | Rando |
| 5,870,220 A | 2/1999 | Migdal et al. |
| 5,900,611 A | 5/1999 | Hecht |
| 5,923,428 A | 7/1999 | Woodworth |
| 5,929,856 A | 7/1999 | LoNegro et al. |
| 5,969,823 A | 10/1999 | Wurz et al. |
| 5,978,512 A | 11/1999 | Kim et al. |
| 5,979,760 A | 11/1999 | Freyman et al. |
| 5,991,041 A | 11/1999 | Woodworth |
| 6,049,386 A | 4/2000 | Stringer et al. |
| 6,053,409 A | 4/2000 | Brobst et al. |
| 6,064,759 A | 5/2000 | Buckley et al. |
| 6,069,696 A | 5/2000 | McQueen et al. |
| 6,137,577 A | 10/2000 | Woodworth |
| 6,177,999 B1 | 1/2001 | Wurz et al. |
| 6,246,468 B1 | 6/2001 | Dimsdale |
| 6,336,587 B1 | 1/2002 | He et al. |
| 6,373,579 B1 | 4/2002 | Ober et al. |
| 6,457,642 B1 | 10/2002 | Good et al. |
| 6,517,004 B2 | 2/2003 | Good et al. |
| 6,674,904 B1 | 1/2004 | McQueen |
| 6,705,526 B1 | 3/2004 | Zhu et al. |
| 6,824,058 B2 | 11/2004 | Patel et al. |
| 6,832,725 B2 | 12/2004 | Gardiner et al. |
| 6,858,857 B2 | 2/2005 | Pease et al. |
| 6,971,580 B2 | 12/2005 | Zhu et al. |
| 7,085,409 B2 | 8/2006 | Sawhney et al. |
| 7,086,162 B2 | 8/2006 | Tyroler |
| 7,104,453 B1 | 9/2006 | Zhu et al. |
| 7,128,266 B2 | 10/2006 | Zhu et al. |
| 7,159,783 B2 | 1/2007 | Walczyk et al. |
| 7,277,187 B2 | 10/2007 | Smith et al. |
| 7,307,653 B2 | 12/2007 | Dutta |
| 7,413,127 B2 | 8/2008 | Ehrhart et al. |
| 7,527,205 B2 | 5/2009 | Zhu |
| 7,586,049 B2 | 9/2009 | Wurz |
| 7,726,575 B2 | 6/2010 | Wang et al. |
| 7,788,883 B2 | 9/2010 | Buckley et al. |
| 7,974,025 B2 | 7/2011 | Topliss |
| 8,027,096 B2 | 9/2011 | Feng et al. |
| 8,028,501 B2 | 10/2011 | Buckley et al. |
| 8,050,461 B2 | 11/2011 | Shpunt et al. |
| 8,055,061 B2 | 11/2011 | Katano |
| 8,102,395 B2 | 1/2012 | Kondo et al. |
| 8,132,728 B2 | 3/2012 | Dwinell et al. |
| 8,134,717 B2 | 3/2012 | Pangrazio et al. |
| 8,212,889 B2 | 7/2012 | Chanas et al. |
| 8,228,510 B2 | 7/2012 | Pangrazio et al. |
| 8,294,969 B2 | 10/2012 | Plesko |
| 8,305,458 B2 | 11/2012 | Hara |
| 8,310,656 B2 | 11/2012 | Zalewski |
| 8,313,380 B2 | 11/2012 | Zalewski et al. |
| 8,317,105 B2 | 11/2012 | Kotlarsky et al. |
| 8,322,622 B2 | 12/2012 | Liu |
| 8,339,462 B2 | 12/2012 | Stec et al. |
| 8,350,959 B2 | 1/2013 | Topliss et al. |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,976 B2 | 2/2013 | Mohideen et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,437,539 B2 | 5/2013 | Komatsu et al. |
| 8,441,749 B2 | 5/2013 | Brown et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,570,343 B2 | 10/2013 | Halstead |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |

(56) References Cited

U.S. PATENT DOCUMENTS

| | | |
|---|---|---|
| 8,723,804 B2 | 5/2014 | Fletcher et al. |
| 8,723,904 B2 | 5/2014 | Marty et al. |
| 8,727,223 B2 | 5/2014 | Wang |
| 8,736,909 B2 | 5/2014 | Sato et al. |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 2002/0118874 A1 | 8/2002 | Chung et al. |
| 2002/0179708 A1 | 12/2002 | Zhu et al. |
| 2003/0038179 A1 | 2/2003 | Tsikos et al. |
| 2003/0053513 A1 | 3/2003 | Vatan et al. |
| 2003/0091227 A1 | 5/2003 | Chang et al. |
| 2003/0156756 A1 | 8/2003 | Gokturk et al. |
| 2004/0155975 A1 | 8/2004 | Hart et al. |
| 2004/0165090 A1 | 8/2004 | Ning |
| 2004/0211836 A1 | 10/2004 | Patel et al. |
| 2004/0233461 A1 | 11/2004 | Armstrong et al. |
| 2005/0117215 A1 | 6/2005 | Lange |
| 2005/0128196 A1 | 6/2005 | Popescu et al. |
| 2006/0151604 A1 | 7/2006 | Zhu et al. |
| 2006/0159307 A1 | 7/2006 | Anderson et al. |
| 2006/0232681 A1 | 10/2006 | Okada |
| 2006/0269165 A1 | 11/2006 | Viswanathan |
| 2007/0031064 A1 | 2/2007 | Zhao et al. |
| 2007/0063048 A1 | 3/2007 | Havens et al. |
| 2007/0181685 A1 | 8/2007 | Zhu et al. |
| 2007/0237356 A1 | 10/2007 | Dwinell et al. |
| 2008/0013793 A1 | 1/2008 | Hillis et al. |
| 2008/0035390 A1 | 2/2008 | Wurz |
| 2008/0056536 A1 | 3/2008 | Hildreth et al. |
| 2008/0164074 A1 | 7/2008 | Wurz |
| 2008/0185432 A1 | 8/2008 | Caballero et al. |
| 2008/0212168 A1 | 9/2008 | Olmstead et al. |
| 2009/0134221 A1 | 5/2009 | Zhu et al. |
| 2009/0268023 A1 | 10/2009 | Hsieh |
| 2009/0313948 A1 | 12/2009 | Buckley et al. |
| 2009/0323084 A1 | 12/2009 | Dunn et al. |
| 2010/0035637 A1 | 2/2010 | Varanasi et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0202702 A1 | 8/2010 | Benos et al. |
| 2010/0208039 A1 | 8/2010 | Stettner |
| 2010/0220894 A1 | 9/2010 | Ackley et al. |
| 2011/0169999 A1 | 7/2011 | Grunow et al. |
| 2011/0202554 A1 | 8/2011 | Powilleit et al. |
| 2011/0249864 A1 | 10/2011 | Venkatesan et al. |
| 2011/0279916 A1 | 11/2011 | Brown et al. |
| 2011/0286007 A1 | 11/2011 | Pangrazio et al. |
| 2012/0056982 A1 | 3/2012 | Katz et al. |
| 2012/0081714 A1 | 4/2012 | Pangrazio et al. |
| 2012/0111946 A1 | 5/2012 | Golant |
| 2012/0138685 A1 | 6/2012 | Qu et al. |
| 2012/0168512 A1 | 7/2012 | Kotlarsky et al. |
| 2012/0185094 A1 | 7/2012 | Rosenstein et al. |
| 2012/0193423 A1 | 8/2012 | Samek |
| 2012/0197464 A1 | 8/2012 | Wang et al. |
| 2012/0203647 A1 | 8/2012 | Smith |
| 2012/0218436 A1 | 8/2012 | Rodriguez et al. |
| 2012/0223141 A1 | 9/2012 | Good et al. |
| 2012/0228382 A1 | 9/2012 | Havens et al. |
| 2012/0242852 A1 | 9/2012 | Hayward et al. |
| 2012/0248188 A1 | 10/2012 | Kearney |
| 2012/0262558 A1 | 10/2012 | Boger et al. |
| 2012/0280908 A1 | 11/2012 | Rhoads et al. |
| 2012/0282905 A1 | 11/2012 | Owen |
| 2012/0282911 A1 | 11/2012 | Davis et al. |
| 2012/0284012 A1 | 11/2012 | Rodriguez et al. |
| 2012/0284122 A1 | 11/2012 | Brandis |
| 2012/0284339 A1 | 11/2012 | Rodriguez |
| 2012/0284593 A1 | 11/2012 | Rodriguez |
| 2012/0293610 A1 | 11/2012 | Doepke et al. |
| 2012/0294549 A1 | 11/2012 | Doepke |
| 2012/0299961 A1 | 11/2012 | Ramkumar et al. |
| 2012/0300991 A1 | 11/2012 | Free |
| 2013/0043312 A1 | 2/2013 | Van Horn |
| 2013/0050426 A1 | 2/2013 | Sarmast et al. |
| 2013/0056285 A1 | 3/2013 | Meagher |
| 2013/0070322 A1 | 3/2013 | Fritz et al. |
| 2013/0075168 A1 | 3/2013 | Amundsen et al. |
| 2013/0101158 A1 | 4/2013 | Lloyd et al. |
| 2013/0175341 A1 | 7/2013 | Kearney et al. |
| 2013/0175343 A1 | 7/2013 | Good |
| 2013/0200158 A1 | 8/2013 | Feng et al. |
| 2013/0256418 A1 | 10/2013 | Havens et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0278425 A1 | 10/2013 | Cunningham et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306730 A1 | 11/2013 | Brady et al. |
| 2013/0306731 A1 | 11/2013 | Pedraro |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0341399 A1 | 12/2013 | Xian et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008430 A1 | 1/2014 | Soule et al. |
| 2014/0008439 A1 | 1/2014 | Wang |
| 2014/0025584 A1 | 1/2014 | Liu et al. |
| 2014/0027518 A1 | 1/2014 | Edmonds et al. |
| 2014/0034731 A1 | 2/2014 | Gao et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061305 A1 | 3/2014 | Nahill et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0075846 A1 | 3/2014 | Woodburn |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0084068 A1 | 3/2014 | Gillet et al. |
| 2014/0097249 A1 | 4/2014 | Gomez et al. |
| 2014/0098792 A1 | 4/2014 | Wang et al. |

(56) References Cited

U.S. PATENT DOCUMENTS

| | | |
|---|---|---|
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1* | 4/2014 | McCloskey et al. .......... 348/135 |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0160329 A1 | 6/2014 | Ren et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0166760 A1 | 6/2014 | Meier et al. |
| 2014/0166761 A1 | 6/2014 | Todeschini et al. |
| 2014/0168787 A1 | 6/2014 | Wang et al. |
| 2014/0175165 A1 | 6/2014 | Havens et al. |
| 2014/0175169 A1 | 6/2014 | Kosecki et al. |
| 2014/0175172 A1 | 6/2014 | Jovanovski et al. |
| 2014/0175174 A1 | 6/2014 | Barber |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0267609 A1 | 9/2014 | Laffargue |

FOREIGN PATENT DOCUMENTS

| | | |
|---|---|---|
| EP | 2381421 A2 | 10/2011 |
| EP | 2722656 A1 | 4/2014 |
| EP | 2779027 A1 | 9/2014 |
| JP | 2008210276 A | 9/2008 |
| KR | 20110013200 A | 2/2011 |
| KR | 20110117020 A | 10/2011 |
| KR | 20120028109 A | 3/2012 |
| WO | 2006095110 A1 | 9/2006 |
| WO | 2007015059 A1 | 2/2007 |
| WO | 2013163789 A1 | 11/2013 |
| WO | 2013166368 A1 | 11/2013 |
| WO | 2013173985 A1 | 11/2013 |
| WO | 2014019130 A1 | 2/2014 |
| WO | 2014110495 A1 | 7/2014 |

OTHER PUBLICATIONS

U.S. Appl. No. 14/376,472, for an Encoded Information Reading Terminal Including HTTP Server filed Aug. 4, 2014, (Lu); 30 pages.

U.S. Appl. No. 13/771,508 for an Optical Redirection Adapter, filed Feb. 20, 2013 (Anderson); 26 pages.

U.S. Appl. No. 14/340,716 for an Optical Imager and Method for Correlating a Medication Package With a Patient, filed Jul. 25, 2014 (Ellis); 26 pages.

U.S. Appl. No. 13/852,097 for a System and Method for Capturing and Preserving Vehicle Event Data, filed Mar. 28, 2013 (Barker et al.); 20 pages.

U.S. Appl. No. 13/902,110 for a System and Method for Display of Information Using a Vehicle-Mount Computer, filed May 24, 2013 (Hollifield); 29 pages.

U.S. Appl. No. 13/902,144, for a System and Method for Display of Information Using a Vehicle-Mount Computer, filed May 24, 2013 (Chamberlin); 23 pages.

U.S. Appl. No. 13/902,242 for a System for Providing a Continuous Communication Link With a Symbol Reading Device, filed May 24, 2013 (Smith et al.); 24 pages.

U.S. Appl. No. 13/912,262 for a Method of Error Correction for 3D Imaging Device, filed Jun. 7, 2013 (Jovanovski et al.); 33 pages.

U.S. Appl. No. 13/912,702 for a System and Method for Reading Code Symbols at Long Range Using Source Power Control, filed Jun. 7, 2013 (Xian et al.); 24 pages.

U.S. Appl. No. 13/922,339 for a System and Method for Reading Code Symbols Using a Variable Field of View, filed Jun. 20, 2013 (Xian et al.); 23 pages.

U.S. Appl. No. 13/927,398 for a Code Symbol Reading System Having Adaptive Autofocus, filed Jun. 26, 2013 (Todeschini); 24 pages.

U.S. Appl. No. 13/930,913 for a Mobile Device Having an Improved User Interface for Reading Code Symbols, filed Jun. 28, 2013 (Gelay et al.); 24 pages.

U.S. Appl. No. 13/933,415 for an Electronic Device Case, filed Jul. 2, 2013 (London et al.); 47 pages.

U.S. Appl. No. 13/947,296 for a System and Method for Selectively Reading Code Symbols, filed Jul. 22, 2013 (Rueblinger et al.); 29 pages.

U.S. Appl. No. 13/950,544 for a Code Symbol Reading System Having Adjustable Object Detection, filed Jul. 25, 2013 (Jiang); 28 pages.

U.S. Appl. No. 13/961,408 for a Method for Manufacturing Laser Scanners, filed Aug. 7, 2013 (Saber et al.); 26 pages.

U.S. Appl. No. 14/018,729 for a Method for Operating a Laser Scanner, filed Sep. 5, 2013 (Feng et al.); 24 pages.

U.S. Appl. No. 14/019,616 for a Device Having Light Source to Reduce Surface Pathogens, filed Sep. 6, 2013 (Todeschini); 23 pages.

U.S. Appl. No. 14/023,762 for a Handheld Indicia Reader Having Locking Endcap, filed Sep. 11, 2013 (Gannon); 31 pages.

U.S. Appl. No. 14/035,474 for Augmented-Reality Signature Capture, filed Sep. 24, 2013 (Todeschini); 33 pages.

U.S. Appl. No. 14/370,267 for Industrial Design for Consumer Device Based Scanning and Mobility, filed Jul. 2, 2014 (Ma et al.); 45 pages.

U.S. Appl. No. 14/336,188 for Method of and System for Detecting Object Weighing Interferences, filed Jul. 21, 2014 (Amundsen et al.); 34 pages.

U.S. Appl. No. 14/055,234 for Dimensioning System, filed Oct. 16, 2013 (Fletcher); 26 pages.

U.S. Appl. No. 14/053,314 for Indicia Reader, filed Oct. 14, 2013 (Huck); 29 pages.

U.S. Appl. No. 14/065,768 for Hybrid System and Method for Reading Indicia, filed Oct. 29, 2013 (Meier et al.); 22 pages.

U.S. Appl. No. 14/074,746 for Self-Checkout Shopping System, filed Nov. 8, 2013 (Hejl et al.); 26 pages.

U.S. Appl. No. 14/074,787 for Method and System for Configuring Mobile Devices via NFC Technology, filed Nov. 8, 2013 (Smith et al.); 28 pages.

(56) References Cited

OTHER PUBLICATIONS

U.S. Appl. No. 14/087,190 for Optimal Range Indicators for Bar Code Validation, filed Nov. 22, 2013 (Hejl); 27 pages.
U.S. Appl. No. 14/345,735 for Optical Indicia Reading Terminal with Combined Illumination filed Mar. 19, 2014 (Ouyang); 19 pages.
U.S. Appl. No. 14/101,965 for High Dynamic-Range Indicia Reading System, filed Dec. 10, 2013 (Xian); 28 pages.
U.S. Appl. No. 14/462,801 for Mobile Computing Device With Data Cognition Software, filed Aug. 19, 2014 (Todeschini et al.); 38 pages.
U.S. Appl. No. 14/150,393 for Incicia-reader Having Unitary Construction Scanner, filed Jan. 8, 2014 (Colavito et al.); 28 pages.
U.S. Appl. No. 14/154,207 for Laser Barcode Scanner, filed Jan. 14, 2014 (Hou et al.); 26 pages.
U.S. Appl. No. 14/277,337 for Multipurpose Optical Reader, filed May 14, 2014 (Jovanovski et al.); 59 pages.
U.S. Appl. No. 14/300,276 for Method and System for Considering Information About an Expected Response When Performing Speech Recognition, filed Jun. 10, 2014 (Braho et al.); 31 pages.
U.S. Appl. No. 14/460,829 for Encoded Information Reading Terminal With Wireless Path Selecton Capability, filed Aug. 15, 2014 (Wang et al.); 40 pages.
U.S. Appl. No. 14/342,544 for Imaging Based Barcode Scanner Engine with Multiple Elements Supported on a Common Printed Circuit Board filed Mar. 4, 2014 (Liu et al.); 27 pages.
U.S. Appl. No. 14/257,174 for Reading Apparatus Having Partial Frame Operating Mode filed Apr. 21, 2014, (Barber et al.), 67 pages.
U.S. Appl. No. 14/200,405 for Indicia Reader for Size-Limited Applications filed Mar. 7, 2014 (Feng et al.); 42 pages.
U.S. Appl. No. 14/166,103 for Indicia Reading Terminal Including Optical Filter filed Jan. 28, 2014 (Lu et al.); 29 pages.
U.S. Appl. No. 14/460,387 for Apparatus for Displaying Bar Codes From Light Emitting Display Surfaces filed Aug. 15, 2014 (Van Horn et al.); 40 pages.
U.S. Appl. No. 14/310,226 for Autofocusing Optical Imaging Device filed Jun. 20, 2014 (Koziol et al.); 28 pages.
U.S. Appl. No. 14/305,153 for Indicia Reading System Employing Digital Gain Control filed Jun. 16, 2014 (Xian et al.); 53 pages.
U.S. Appl. No. 14/327,722 for Customer Facing Imaging Systems and Methods for Obtaining Images filed Jul. 10, 2014 (Oberpriller et al,); 39 pages.
U.S. Appl. No. 14/329,303 for Cell Phone Reading Mode Using Image Timer filed Jul. 11, 2014 (Coyle); 22 pages.
U.S. Appl. No. 14/370,237 for Web-Based Scan-Task Enabled System and Method of and Apparatus for Developing and Deploying the Same on a Client-Server Network filed Jul. 2, 2014 (Chen et al.); 65 pages.
U.S. Appl. No. 14/333,588 for Symbol Reading System With Integrated Scale Base filed Jul. 17, 2014 (Barten); 59 pages.
U.S. Appl. No. 14/446,387 for Indicia Reading Terminal Processing Plurality of Frames of Image Data Responsively to Trigger Signal Activation filed Jul. 30, 2014 (Wang et al.); 76 pages.
U.S. Appl. No. 14/446,391 for Multifunction Point of Sale Apparatus With Optical Signature Capture filed Jul. 30, 2014 (Good et al.); 37 pages.
U.S. Appl. No. 14/519,179, Serge Thuries et al., filed Oct. 21, 2014, not published yet. 40 pages.
U.S. Appl. No. 14/519,249, H. Sprague Ackley et al., filed Oct. 21, 2014, not published yet. 36 pages.
U.S. Appl. No. 14/519,233, Franck Laffargue et al., filed Oct. 21, 2014, not published yet. 34 pages.
U.S. Appl. No. 14/519,211, H. Sprague Ackley et al., filed Oct. 21, 2014, not published yet. 33 pages.
U.S. Appl. No. 14/519,195, Franck Laffargue et al., filed Oct. 21, 2014, not published yet. 35 pages.
Peter Clarke, Actuator Developer Claims Anti-Shake Breakthrough for Smartphone Cams, Electronic Engineering Times, p. 24, May 16, 2011.
U.S. Appl. No. 14/055,234, not yet published, Hand Held Products, Inc. filed Oct. 16, 2013; 26 pages.
U.S. Appl. No. 13/912,262, not yet published, filed Jun. 7, 2013, Hand Held Products Inc., Method of Error Correction for 3D Imaging Device: 33 pages.
European Search Report for application No. EP13186043 (now EP2722656 (Apr. 23, 2014)): Total pp. 7.
International Search Report for PCT/US2013/039438 (WO2013166368), Oct. 1, 2013, 7 pages.
U.S. Appl. No. 14/453,019, not yet published, filed Aug. 6, 2014, Hand Held Products Inc., Dimensioning System With Guided Alignment: 31 pages.
European Office Action for application EP 13186043, dated Jun. 12, 2014(now EP2722656 (Apr. 23, 2014)), Total of 6 pages.
U.S. Appl. No. 14/461,524, not yet published, filed Aug. 18, 2014, Hand Held Products Inc., System and Method for Package Dimensioning: 21 pages.
U.S. Appl. No. 14/490,989, not yet published, filed Sep. 19, 2014, Intermec IP Corporation, Volume Dimensioning System Calibration Systems and Methods:.
Wikipedia, YUV description and definition, downloaded from http://www.wikipeida.org/wiki/YUV on Jun. 29, 2012, 10 pages.
YUV Pixel Format, downloaded from http://www.fource.org/yuv.php on Jun. 29, 2012; 13 pages.
YUV to RGB Conversion, downloaded from http://www.fource.org/fccyvrgb.php on Jun. 29, 2012; 5 pages.
Benos et al., "Semi-Automatic Dimensioning with Imager of a Portable Device," U.S. Appl. No. 61/149,912, filed Feb. 4, 2009 (now expired), 56 pages.
Dimensional Weight—Wikipedia, the Free Encyclopedia, URL=http://en.wikipedia.org/wiki/Dimensional_weight, download date Aug. 1, 2008, 2 pages.
Dimensioning—Wikipedia, the Free Encyclopedia, URL=http://en.wikipedia.org/wiki/Dimensioning, download date Aug. 1, 2008, 1 page.
U.S. Appl. 14/274,858 for Mobile Printer With Optional Battery Accessory, filed May 12, 2014, (Marty et al.); 26 pages.
U.S. Appl. No. 14/264,173 for Autofocus Lens System for Indicia Readers filed Apr. 29, 2014, (Ackley et al.); 39 pages.
U.S. Appl. No. 14/453,019 for Dimensioning System With Guided Alignment, filed Aug. 6, 2014 (Li et al.); 31 pages.
U.S. Appl. No. 14/452,697 for Interactive Indicia Reader , filed Aug. 6, 2014, (Todeschini); 32 pages.
U.S. Appl. No. 14/231,898 for Hand-Mounted Indicia-Reading Device with Finger Motion Triggering filed Apr. 1, 2014 (Van Horn et al.); 36 pages.
U.S. Appl. No. 29/486,759 for an Imaging Terminal, filed Apr. 2, 2014 (Oberpriller et al.); 8 pages.
U.S. Appl. No. 29/436,337 for an Electronic Device, filed Nov. 5, 2012 (Fitch et al.); 19 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 29/459,681 for an Electronic Device Enclosure, filed Jul. 2, 2013 (Chaney et al.); 14 pages.
U.S. Appl. No. 29/459,785 for a Scanner and Charging Base, filed Jul. 3, 2013 (Fitch et al.); 21 pages.
U.S. Appl. No. 29/459,823 for a Scanner, filed Jul. 3, 2013 (Zhou et al.); 13 pages.
U.S. Appl. No. 29/468,118 for an Electronic Device Case, filed Sep. 26, 2013 (Oberpriller et al.); 44 pages.
U.S. Appl. No. 14/340,627 for an Axially Reinforced Flexible Scan Element, filed Jul. 25, 2014 (Reublinger et al.); 41 pages.
U.S. Appl. No. 29/492,903 for an Indicia Scanner, filed Jun. 4, 2014 (Zhou et al.); 23 pages.
U.S. Appl. No. 29/494,725 for an In-Counter Barcode Scanner, filed Jun. 24, 2014 (Oberpriller et al.); 23 pages.
U.S. Appl. No. 14/327,827 for a Mobile-Phone Adapter for Electronic Transactions, filed Jul. 10, 2014 (Hejl); 25 pages.
U.S. Appl. No. 14/334,934 for a System and Method for Indicia Verification, filed Jul. 18, 2014 (Hejl); 38 pages.
U.S. Appl. No. 14/339,708 for Laser Scanning Code Symbol Reading System, filed Jul. 24, 2014 (Xian et al.); 39 pages.

(56) References Cited

OTHER PUBLICATIONS

U.S. Appl. No. 14/379,057 for Method of Using Camera Sensor Interface to Transfer Multiple Channels of Scan Data Using an Image Format filed Aug. 15, 2014 (Wang et al.); 28 pages.

U.S. Appl. No. 14/283,282 for Terminal Having Illumination and Focus Control filed May 21, 2014 (Liu et al.); 31 pages.

Caulier Yannick et al: "A new type of color-coded light sturctures for an adapted and rapid determination of point correspondences for 3D reconstruction", Optical Measurement Systems for Industrial Insepction VII, SPIE, vol. 8082, No. 1, May 23, 2011: pp. 1-8.

Mouaddib E. et al.: "Recent progress in structured light in order to solve the correspondence problem in stereovision", Robotics and Automation, 1997 Proceedings., 1997 IEEE International Conference, Apr. 20-25, 1997. IEE vol. 1, Apr. 20, 1997 pp. 130-136.

Aleksei Kazantsev et al: "Robust pseudo-random coded colored structured light technique for 3D object model recovery", Robotic and Sendors Environments, 2008, IEEE Oct. 17, 2008, pp. 150-155.

Salvi J. et al: "Pattern codification strategies in structured light systems", Pattern REcognition, vol. 37. No. 4, Mar. 6, 2003, pp. 827-849.

Proesmans M. et al: "Active acquisition of 3D Shape for moving objects", Proceedings of the International Conference on Image Processing (ICIP), vol. 3, Sep. 16, 1996 pp. 647-650.

EP Search Report, Jun. 30, 2014, Application No. 14157971.4-1906, 6 pages.

EP Office Action, Communication pursiant to Article 94(3) EPC, Application No. 14157971.4-1906, Jul. 16, 2014, 5 pages.

\* cited by examiner

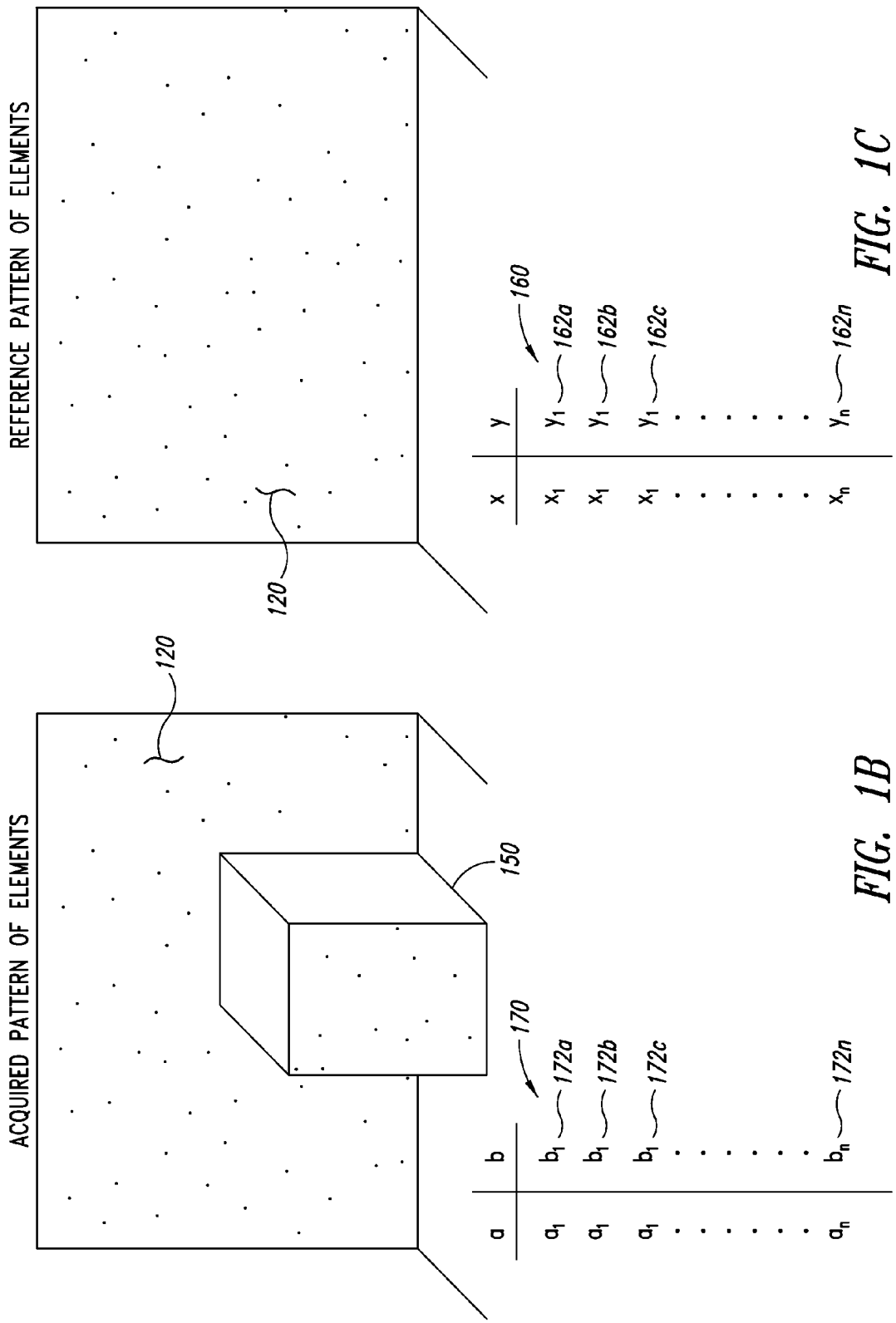

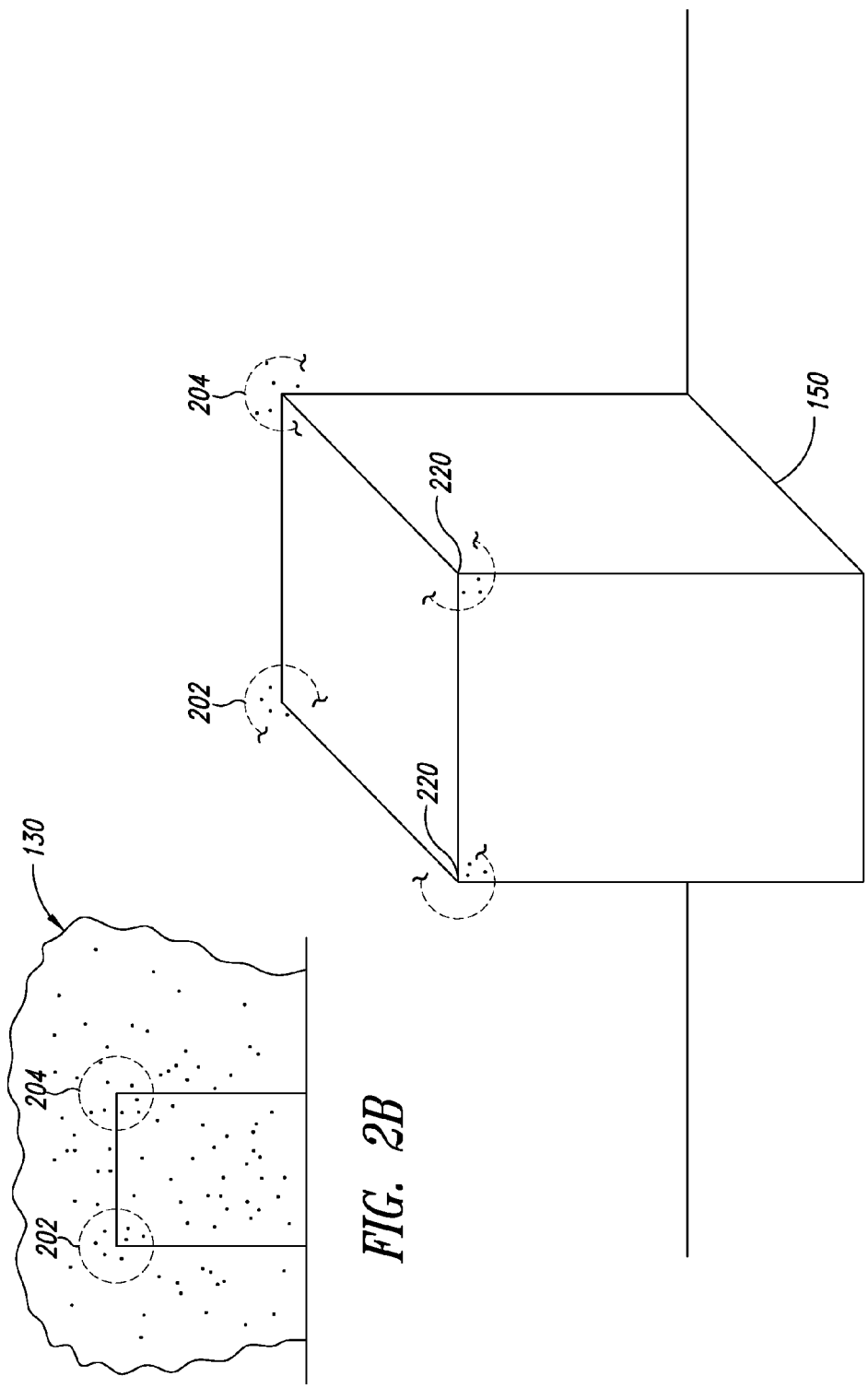

SYSTEMS AND METHODS FOR ENHANCING DIMENSIONING, FOR EXAMPLE VOLUME DIMENSIONING

BACKGROUND

1. Field

This disclosure generally relates to non-contact dimensioning systems and methods for determining dimensions and/or volume of objects.

2. Description of the Related Art

Dimensioning systems are useful for providing dimensional and volumetric data related to three-dimensional objects disposed within a field-of-view of the dimensioning system. Such dimensional and volumetric information is useful for example, in providing consumers with accurate shipping rates based on the actual size and volume of the object being shipped. Additionally, the dimensioning system's ability to transmit parcel data immediately to a carrier can assist the carrier in selecting and scheduling appropriately sized vehicles based on measured cargo volume and dimensions. Finally, the ready availability of dimensional and volumetric information for all the objects within a carrier's network assists the carrier in ensuring optimal use of available space in the many different vehicles, containers and/or warehouses used in local, interstate, and international commerce.

A wide variety of computing devices are used within the shipping industry. For example, personal computers used as multi-tasking terminals in small storefront packing and shipping establishments. Also, for example, dedicated self-service shipping kiosks found in many post offices. As a further example, dedicated handheld scanners are frequently used as mobile terminals by many international shipping corporations. The wide variety of form factors found in the shipping industry are quite diverse, yet all rely upon providing accurate information, such as parcel dimensions and volume, to both the user in order to provide accurate shipping rates and to the carrier in order to accurately forecast shipping volumes.

A number of volume dimensioning systems rely upon the use of structured light. By projecting a structured light pattern into a three-dimensional space containing at least one object, the shift in position (i.e., parallax) of the structured light within the three-dimensional space may be used to determine one or more dimensions of the object. The comparison between the structured light pattern present in the acquired image containing the object and a reference image to determine the parallax shift and consequently the volume dimensions of the object is performed graphically, often by comparing portions of the acquired image to portions of the entire reference image to determine a pattern "match." Such image intensive processing requires significant computing resources and speed to provide response times expected for use in commerce and industry.

Structured light patterns can take many forms, including an outwardly apparent random pattern of elements (e.g., visible or invisible electromagnetic radiation in the form of "dots" or "spots") which is, to the contrary, highly structured. The arrangement of elements within the pattern is such that any group including a defined number of elements (e.g., three or more) is unique among all other groups containing an identical number of elements within in the pattern. Thus in some element patterns, any group of seven elements is unique among all groups of seven elements appearing in the pattern.

Projecting such a pattern of elements into a three-dimensional space that includes an object for volume dimensioning permits the determination of the volume dimension of the object based on the parallax shift that occurs in at least a portion of the elements in the pattern when the acquired image data is compared to reference data of the three-dimensional space without the object. Determination of parallax shift between the acquired image of the three-dimensional space with an object and containing the pattern of elements and a reference image containing the pattern of elements is a two step process in which corresponding elements in the acquired image and the reference image are identified. After corresponding elements in the reference image and the acquired image are identified, the parallax shift between the elements can be calculated, and dimensional information of the object obtained.

The identification of corresponding elements in the reference image and the acquired image may be performed graphically using a processor-based device to sequentially compare a portion of the acquired image with portions of the reference image until a "match" between the patterns is detected by the processor. Such graphical comparisons are generally computationally intensive, requiring the use of either high speed processors or multiple processors to reduce the time required to match the pattern in the acquired image with the pattern in the reference image to a level acceptable for use in industry and commerce.

BRIEF SUMMARY

It has been advantageously found that if element location data is extracted from the acquired image and compiled as numerical data into a coordinate data list, such a list of numerical element location data may be more expeditiously compared to numerical reference element location data in a similar reference data list. Such comparisons of numerical lists are well within the capabilities of lower speed processors such as those found in many portable electronic devices. Thus, the use of a coordinate data list including numerical data indicative of element locations in an element pattern obtained from an acquired image of a three-dimensional space containing an object and a reference data list including numerical data indicative of reference element locations in a reference element pattern can speed the volume dimensioning process and advantageously permit the use of portable electronic devices to provide highly accurate volume dimensioning data.

Additional enhancements in speed and efficiency of pattern matching are obtained by sorting the coordinate data list and/or the reference data list. Another enhancement to the speed and efficiency of pattern matching is obtained by comparing a limited number of groups of pattern elements, each group including a sufficient number of elements to form a unique set of elements within the acquired image to the reference data list. Such a comparison between coordinate data associated with element locations in a group including a limited number of elements and the coordinate data of reference elements in the reference data list can be performed using patterned searches. For example, a search focusing only on coordinate locations of reference elements within the reference data list that are proximate a reference element matching an element included in a group of elements may beneficially take advantage of the fact that elements included in the group of elements are often found to match reference elements in close proximity within the reference data list.

Another enhancement in speed and efficiency of pattern matching is obtained by converting the coordinate locations of acquired elements included in a particular group into a locally referenced locations in which the locations of all of the elements included in the particular group are locally referenced to a single element included in the respective group.

For example, an angle and a distance may be used to reference the location of each of the elements included in a group to a single element in the respective group. The coordinate data of the reference elements included in the reference data list may be converted to a similar locally-referenced coordinate system. The unique angle and distance data for each group can then be compared with reference angle and distance data for the reference elements included in the reference data list. In such an instance, determining the correspondence between the reference element in the group (i.e., the "origin," for the locally referenced coordinate system) and a reference element in the reference data list effective matches every element in the group with a corresponding reference element in the reference data list.

An enhancement in dimensional accuracy may be obtained by more precisely determining the center of intensity of each element appearing in the pattern in the acquired image data prior to determining the coordinates of the respective element. Such a center of intensity may be determined by analyzing the grayscale intensity distribution of each element in the acquired image data to identify a "center of intensity" of the element and associating the coordinate location of the element with the identified center of intensity of the respective element.

A portable structured light dimensioning system to determine a volume dimension of an object may be summarized as including an image acquisition device to acquire image data representative of at least an element pattern projected into a three dimensional space that includes at least one object; at least one processor communicably coupled to the image acquisition device; and at least one nontransitory storage medium communicably coupled to the at least one processor and having stored therein at least one set of machine executable instructions that when executed by the at least one processor cause the at least one processor to: determine coordinate data associated with each element location in at least a portion of the element pattern present in the acquired image data; generate a number of coordinate data lists, each including coordinate data associated with at least three element locations in the acquired image data; for each coordinate data list: compare the coordinate data associated with each of the at least three element locations in the acquired image data with a reference data list including reference coordinate data associated with reference element locations in a reference element pattern; and select for each of the at least three element locations, a corresponding reference element location in the reference element pattern; and determine a spatial shift between the coordinate data associated with each of the at least three element locations in the acquired image data and the coordinate data associated with the respective corresponding reference element location in the reference element pattern.

The machine executable instructions, when executed by the at least one processor, may further cause the at least one processor to: for each coordinate data list, compare the coordinate data associated with each of the at least three element locations in the acquired image data with a reference data list by performing for the coordinate data associated with each of the at least three element locations, at least one of: a top-to-bottom search, or, a bottom-to-top search of the reference data list to compare the coordinate data associated with the respective element location with coordinate data associated with each reference element location in the reference data list.

The machine executable instructions, when executed by the at least one processor, may further cause the processor to: for each coordinate data list, sort the coordinate data using a defined sort pattern to provide a respective ordered coordinate data list.

The machine executable instructions, when executed by the at least one processor, may further cause the at least one processor to: for each ordered coordinate data list perform at least one of a top-to-bottom search or a bottom-to-top search of the reference data list to compare the coordinate data associated with a first element location in the ordered coordinate data list with coordinate data associated with each reference element location in the reference data list; and for coordinate data in the ordered coordinate data list associated with each remaining element location, perform at least one of an upward search, a downward search, or an alternating upward/downward search about coordinate data associated with a reference element in the reference data list corresponding to coordinate data associated with an immediately preceding element location.

The machine executable instructions, when executed by the at least one processor, may further cause the at least one processor to: for each ordered coordinate data list perform at least one of a top-to-bottom search or a bottom-to-top search of an ordered reference data list to compare the coordinate data associated with a first element location in the ordered coordinate data list with coordinate data associated with each reference element location in the ordered reference data list; and for coordinate data in the ordered coordinate data list associated with each remaining element location, perform at least one of an upward search, a downward search, or an alternating upward/downward search about coordinate data associated with a reference element in the ordered reference data list corresponding to coordinate data associated with an immediately preceding remaining element location.

The machine executable instructions, when executed by the at least one processor, may further cause the processor to: generate an ordered coordinate data list about each of a number of points of interest in the acquired image data to provide the number of ordered coordinate data lists, each ordered coordinate data list including coordinate data associated with each of at least three element locations about each respective point of interest.

The machine executable instructions, when executed by the at least one processor, may further cause the at least one processor to: accept a number of user inputs, each of the user inputs corresponding to one of the number of points of interest in the acquired image data.

The machine executable instructions, when executed by the at least one processor, may further cause the at least one processor to: autonomously determine each of the number of points of interest in the acquired image data.

The machine executable instructions, when executed by the at least one processor, may further cause the processor to: for each ordered coordinate data list, convert the coordinate data associated with the at least three element locations in the acquired image data to a second, locally-referenced coordinate system that relates the coordinate data associated a first of the at least three elements included the respective ordered coordinate data list to the coordinate data associated with each of the other of the at least three elements included in the respective ordered coordinate data list to provide a respective ordered, locally referenced, coordinate data list.

The machine executable instructions, when executed by the at least one processor, may further cause the at least one processor to: for each ordered, locally referenced, coordinate data list perform at least one of a top-to-bottom search or a bottom-to-top search of a locally-referenced, reference data list in which the coordinate data associated with each reference element is related to coordinate data associated with a number of neighboring reference elements in the reference pattern, to compare the locally-referenced coordinate data associated with the first of the at least three elements in the ordered, locally-referenced, coordinate data list with coordinate data associated with each reference element location in the locally-referenced, reference data list.

The machine executable instructions, when executed by the at least one processor, may further cause the processor to: determine a center of intensity of element locations in at least a portion of the element pattern present in the acquired image data; and determine coordinate data corresponding to the determined center of intensity of the element locations in at least a portion of the element pattern present in the acquired image data.

The machine executable instructions, when executed by the at least one processor, may further cause the processor to: determine a center of intensity of element locations in at least a portion of the element pattern present in the acquired image data using grayscale values associated with each of the respective element locations.

The machine executable instructions, when executed by the at least one processor, may further cause the at least one processor to: determine a respective distance between the image acquisition device and each of the elements in at least a portion of the pattern of elements incident upon the at least one object positioned in the three-dimensional space.

The machine executable instructions, when executed by the at least one processor, may further cause the at least one processor to: determine a respective volume dimension associated with the at least one object using the determined respective distances between the image acquisition device and each of the elements in at least a portion of the pattern of elements incident upon the at least one object positioned in the three-dimensional space.

A structured light dimensioning method to determine a volume dimension of an object may be summarized as including determining by at least one processor coordinate data corresponding to element locations in at least a portion of the element pattern present in acquired image data provided by at least one communicably coupled image capture device; generating by the at least one processor a number of coordinate data lists, each coordinate data list including coordinate data associated with at least three element locations in the acquired image data; storing each of the number of coordinate data lists in at least one nontransitory storage media communicably coupled to the at least one processor; for each coordinate data list: comparing by the at least one processor the coordinate data associated each of the at least three element locations in the acquired image data with a reference data list stored in at least one nontransitory storage media communicably coupled to the at least one processor, the reference data list including reference coordinate data associated with reference element locations in a reference element pattern; selecting by the at least one processor, for each of the at least three element locations, a corresponding reference element location in the reference element pattern; and determining by the at least one processor a spatial shift between the coordinate data associated with each of the at least three element locations in the acquired image data and the coordinate data associated with the respective corresponding reference element location in the reference element pattern.

Comparing by the at least one processor the coordinate data associated each of the at least three element locations in the acquired image data with a reference data list may include comparing by the at least one processor the coordinate data associated each of the at least three element locations in the acquired image data with a reference data list by performing for the coordinate data associated with each of the at least three element locations, at least one of a top-to-bottom search or a bottom-to-top search of the reference data list to compare the coordinate data associated with the respective element location with coordinate data associated with each reference element location in the reference data list.

The method may further include for each coordinate data list, sorting by the at least one processor the coordinate data using a defined sort pattern to provide a respective ordered coordinate data list.

The method may further include for each ordered coordinate data list, performing by the at least one processor at least one of a top-to-bottom search or a bottom-to-top search of the reference data list to compare the coordinate data associated with a first element location in the ordered coordinate data list with coordinate data associated with each reference element location in the reference data list; and for coordinate data in the ordered coordinate data list associated with each remaining element location, performing by the at least one processor at least one of an upward search, a downward search, or an alternating upward/downward search about coordinate data associated with a reference element in the reference data list corresponding to coordinate data associated with an immediately preceding element location.

The method may further include for each ordered coordinate data list, performing by the at least one processor at least one of a top-to-bottom search or a bottom-to-top search of an ordered reference data list to compare the coordinate data associated with a first element location in the ordered coordinate data list with coordinate data associated with each reference element location in the ordered reference data list; and for coordinate data in the ordered coordinate data list associated with each remaining element location, performing by the at least one processor at least one of an upward search, a downward search, or an alternating upward/downward search about coordinate data associated with a reference element in the ordered reference data list corresponding to coordinate data associated with an immediately preceding remaining element location.

Generating by the at least one processor a number of coordinate data lists may include generating by the at least one processor, an ordered coordinate data list proximate each of a number of points of interest in the acquired image data to provide the number of ordered coordinate data lists, each ordered coordinate data list including coordinate data associated with each of at least three element locations about each respective point of interest.

The method may further include accepting by the at least one processor, a number of user inputs provided via at least one user interface communicably coupled to the at least one processor, each of the user inputs corresponding to one of the number of points of interest in the acquired image data.

The method may further include autonomously determining by the at least one processor, each of the number of points of interest in the acquired image data.

The method may further include for each ordered coordinate data list, converting by the at least one processor, the coordinate data associated with the at least three element locations in the acquired image data to a second, locally-referenced coordinate system that relates the coordinate data associated a first of the at least three elements included the respective ordered coordinate data list to the coordinate data associated with each of the other of the at least three elements included in the respective ordered coordinate data list to provide a respective ordered, locally referenced, coordinate data list.

Comparing by the at least one processor the coordinate data associated each of the at least three element locations in the acquired image data with the reference data list stored in at least one nontransitory storage media communicably coupled to the at least one processor may include for each ordered, locally referenced, coordinate data list performing by the at least one processor at least one of a top-to-bottom search or a bottom-to-top search of a locally-referenced, reference data list in which the coordinate data associated with each reference element is related to coordinate data associated with a number of neighboring reference elements in the reference pattern, to compare the locally-referenced coordinate data associated with the first of the at least three elements in the ordered, locally-referenced, coordinate data list with coordinate data associated with each reference element location in the locally-referenced, reference data list.

The method may further include determining by the at least one processor a center of intensity of element locations in at least a portion of the element pattern present in the acquired image data.

Generating by the at least one processor a number of coordinate data lists, each coordinate data list including coordinate data associated with at least three element locations in the acquired image data may include generating by the at least one processor a number of coordinate data lists, each coordinate data list including coordinate data corresponding to the determined center of intensity of the at least three element locations in the acquired image data.

Determining by the at least one processor a center of intensity of element locations in at least a portion of the element pattern present in the acquired image data may include determining by the at least one processor the center of intensity of element locations in at least a portion of the element pattern present in the acquired image data using a number of grayscale values associated with each of the respective element locations.

The method may further include determining by the at least one processor a respective distance between the image acquisition device and each of the elements in at least a portion of the pattern of elements incident upon the at least one object positioned in the three-dimensional space.

The method may further include determining by the at least one processor a respective volume dimension associated with the at least one object using the determined respective distances between the image acquisition device and each of the elements in at least a portion of the pattern of elements incident upon the at least one object positioned in the three-dimensional space.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 1B is a schematic diagram of an example element pattern projected into the three-dimensional space which includes an object and an associated Cartesian coordinate data list including coordinate data associated with the location each element in the pattern of elements, according to one illustrated embodiment.

FIG. 1C is a schematic diagram of an example reference element pattern projected into a three-dimensional space and an associated reference data list including Cartesian coordinate data associated with the location of each reference element, according to one illustrated embodiment.

FIG. 2B is a front elevational view of a portion of an example pattern of elements projected onto an object in a three-dimensional space and including two groups of elements, each containing a number of elements having a unique spatial arrangement among the pattern of elements about two identified points of interest, according to one illustrated embodiment.

FIG. 2C is a perspective view of a portion of the example pattern of elements in FIG. 2B projected onto the object in the three-dimensional space and including two groups of elements, each containing a number of elements having a unique spatial arrangement among the pattern of elements about the two identified points of interest, according to one illustrated embodiment.

DETAILED DESCRIPTION

Figure 1A:
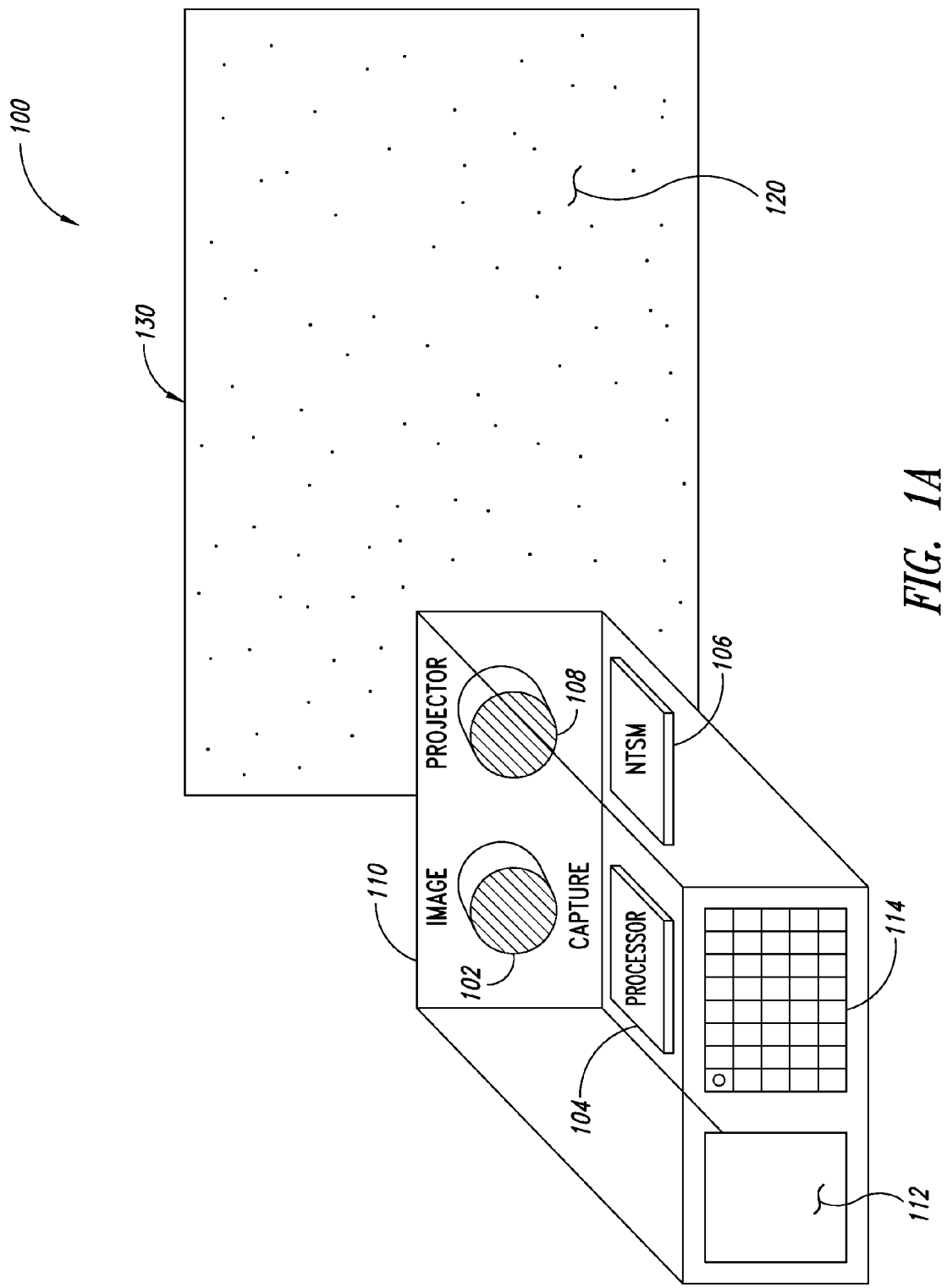
FIG. 1A is a perspective view of an example dimensioning system using a structured light pattern including a number of elements projected into a three-dimensional space, according to one illustrative embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with sources of electromagnetic energy, operative details concerning image sensors, cameras, structured light, and detailed architecture and operation of the imaging system have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

As used herein, the term "element" refers to any projected sensible (e.g., visible light) or detectable (e.g., infrared) or otherwise discernable electromagnetic radiation forming at least a portion of a larger pattern. Elements can have any shape or geometry including shapes and geometries that are altered or varied in one or more dimensions as a function of distance from the projection device providing the electromagnetic radiation. In at least some instances, such elements may be variously referred to as "dots," "points," or "spots."

As used herein, the term "pattern of elements" and "reference pattern of elements" refers to a pattern of elements appearing outwardly random, yet is highly structured and reproducible such that any group of a defined number of elements in the pattern provides a unique spatial geometry that is not reproduced elsewhere in the overall pattern by any other grouping of a same number of elements. In some instances, the number of elements forming the unique spatial geometry may number three or more. A "reference pattern of elements" or a "reference element pattern" refers to the case where the pattern of elements is projected into a baseline three-dimensional space having a known spatial geometry to provide a pattern of elements having a known distance between the projection device and each of the elements forming the reference pattern of elements. A common element pattern is used to provide both the reference element pattern and the pattern of elements projected on the object positioned in the three-dimensional space.

FIG. 1A shows a volume dimensioning system 100 including an image acquisition device 102 having a field-of-view, at least one processor communicably coupled to the image acquisition device, at least one non-transitory storage medium 106, and at least one projection device 108 to project an element pattern 130 into a three-dimensional space 120, according to one illustrated embodiment. FIG. 1B shows an image of an object 150 disposed in the three-dimensional space 120 with at least a portion of an element pattern 130 projected on the object 150 and the remainder of the element pattern 130 projected into the three-dimensional space 120 falling within the field-of-view of the image acquisition device 102 and a number of coordinate data lists 170 each including numerical data corresponding to the Cartesian coordinates 172a -172n (collectively "Cartesian coordinates 172") of each of the reference elements included in the respective coordinate list 170, according to one illustrated embodiment. FIG. 1C shows an image of the element pattern 130 projected into the three-dimensional space 120 without an object 150 present, to provide a reference element pattern 140 and a reference data list 160 including numerical data corresponding to the Cartesian coordinates 162a -162n (collectively "Cartesian coordinates 162") of each of the reference elements included in the reference element pattern 140, according to an illustrated embodiment.

The volume dimensioning system may optionally include one or more output devices 112 and one or more input devices 114 communicably coupled to the at least one processor 104. The image acquisition device 102 can acquire image data representative of the three-dimensional space 120 and any objects 150 placed therein that lie within the field-of-view of the image acquisition device 102. The image data acquired by the image acquisition device 102 can include at least a portion of the element pattern 130 projected into the three-dimensional space 120.

The volume dimensioning system 100 determines the distance to objects placed within the three-dimensional space 120 by comparing the element pattern 130 in the acquired image with the element pattern 130 in the reference element pattern 140. By aligning the elements included in the element pattern 130 in the acquired image data with corresponding elements in the reference element pattern 140, shifts in coordinate locations of corresponding elements in the acquired image data and the reference image data can be used to determine a distance between the projection device 108 and each of the respective elements in the element pattern 130.

The image acquisition device 102 can include any number or combination of systems or devices suitable for providing data indicative of the three-dimensional space 120 and any objects placed therein. The image acquisition device 102 is used to acquire image data representative of a scene in the field-of-view of the image acquisition device. When the projection device 108 projects the element pattern 130 into the three-dimensional space 120, the image data acquired by the image acquisition device includes data indicative of the location and optionally the intensity of the elements included in the element pattern 130. Such image data may be generated using an image acquisition device 102 sensitive to incident electromagnetic radiation in the visible electromagnetic spectrum (e.g., wavelengths between about 360 nanometers ("nm") and about 700 nm) when the element pattern 130 is projected in the visible electromagnetic spectrum. Such image data may be generated using an image acquisition device 102 sensitive to incident, invisible, portions of the electromagnetic spectrum, such as the infrared or near-infrared portions of the electromagnetic spectrum (e.g., wavelengths between about 700 nm and about 1000 nm) when the element pattern 130 is projected in an invisible portion of the electromagnetic spectrum.

In some implementations, the image acquisition device 102 may operate in at least a portion of the visible electromagnetic spectrum and in at least a portion of the invisible electromagnetic spectrum (e.g., a charge-coupled device or "CCD" sensor having an operating sensitivity that falls within portions of both the visible and invisible electromagnetic spectrum at wavelengths of from about 360 nm to about 800 nm). Such an image capture device advantageously permits the capture of a element pattern 130 projected in an invisible portion of the electromagnetic spectrum (e.g., near-infrared) while contemporaneously capturing image data in the visible spectrum representative of the field-of-view of the image acquisition device.

In at least some implementations, the image acquisition device 102 may include one or more systems or devices for enhancing or otherwise altering the acquired image data. For example, the image acquisition device 102 may include one or more filters or signal processors to remove or otherwise separate image data representative of the visible portion of the electromagnetic spectrum from image data representative of the invisible portion of the electromagnetic spectrum in at least a portion of the acquired image data.

All or a portion of the acquired image data provided by the image acquisition device 102 can be communicated from the image acquisition device 102 to the at least one processor 104 or the at least one non-transitory storage medium 106. One or more machine executable instruction sets can cause the at least one processor 106 to extract or otherwise separate the portion of the acquired image data corresponding to each of the elements in the element pattern 130. In at least some instances, the machine executable instructions may further cause the at least one processor 104 to determine coordinate data (e.g., Cartesian coordinate data) associated with each element location in at least a portion of the element pattern 130 present in the acquired image data.

In at least some instances, the machine executable instructions may further cause the at least one processor 104 to organize or form the Cartesian coordinates 172 associated with the location of each of the elements in the acquired image data into a number of coordinate data lists 170. Each of the number of coordinate data lists 170 can include a single-dimensional or a two-dimensional array containing numerical data corresponding to the Cartesian coordinates 172 for each of the elements included in the respective coordinate data list 170. In some implementations, the machine executable instructions may further cause the at least one processor 104 to organize or form the Cartesian coordinates 172 corresponding to the locations all of the elements in the acquired image data into a single coordinate data list 170. The at least one processor 104 may store or otherwise retain the number of coordinate data lists 170 in a non-transitory storage media partially or completely within the at least one processor 104, in the at least one non-transitory storage medium 106, or any combination thereof.

One or more sets of machine executable instructions cause the at least one processor 104 to perform a comparison of the numerical data representative of the element locations in each of the number of coordinate data lists 170 with the numerical data representative of the reference element locations in the reference data list 160. The comparison can be performed by the at least one processor 104 as a search of the reference data list 160 for corresponding points appearing in each of the number of coordinate data lists. Advantageously, by performing a numerical comparison of the reference data list 160 with each of the number of coordinate data lists 170, the need for computation resource intensive graphical comparison of acquired image data is eliminated, thereby permitting the comparison using a less powerful, slower processor 106 such as those found in many portable or handheld electronic devices.

For example, a low resolution image acquisition device 102 may provide an acquired image having 1 to 3 megapixels of data. Such an image generates an image data file of at least 1 to 3 megabytes. In contrast, the element pattern 130 includes about 11,000 elements in the acquired image data. By extracting only coordinate data corresponding to the locations of the elements in the element pattern 130 in the acquired image data, the file size may be reduced by up to 100 times. Comparing a coordinate data list containing numerical data corresponding to the coordinate locations of 11,000 elements in the element pattern 130 with a reference data list containing a comparable quantity of numerical data corresponding to the coordinate locations of 11,000 elements in the reference element pattern 140 significantly reduces the necessary computing resources, particularly when compared to a graphical search routine using a 1 to 3 megapixel image.

The at least one processor 104 can compare numerical data representative of the element locations in each of the coordinate data lists 170 is against numerical data representative of the reference element location in a reference data list 160. The at least one processor 104 can then identify reference elements in the reference data list 160 corresponding to each of the elements included in each of the number of coordinate data lists 170. Based on the identified correspondence between elements in the element pattern 130 and reference elements in the reference element pattern 140, the at least one processor 104 can determine the spatial shift between every acquired element and the corresponding reference element.

The search of the reference data list can be performed using any search strategy including a "top-down" search strategy in which numerical data representative of the element locations in each of the coordinate data lists 170 is sequentially compared top-to-bottom to numerical data representative of the reference element locations in a reference data list 160. The search of the reference data list 160 can be performed using a "bottom-up" search strategy in which numerical data representative of the element locations in each of the coordinate data lists 170 is sequentially compared bottom-to-top to numerical data representative of the reference element locations in a reference data list 160. Those of ordinary skill in the computer programming arts will readily appreciate the wide variety of alternative search strategies which may also be used to compare numerical data representative of the element locations in each of the coordinate data lists 170 is against numerical data representative of the reference element locations in a reference data list 160.

The dimensioning system sensor(s) 114 can take a large variety of forms (e.g., digital, analog, still image, molding images) and can be formed from or contain any number of image capture or collection elements, for example picture elements or "pixels." For example, the dimensioning system sensor(s) 114 can have between 1,000,000 pixels (1 MP) and 100,000,000 pixels (100 MP). The dimensioning system sensor(s) 114 can include any number of current or future developed image sensing devices, collectors, or systems that include, but are not limited to, one or more complementary metal-oxide semiconductor ("CMOS") image sensors or one or more charge-coupled device ("CCD") image sensors.

Data is communicated from the image acquisition device 102 to the at least one processor 104 and the at least one non-transitory storage media 106 via a number of serial or parallel data buses (not shown in FIG. 1A). The non-transitory storage media 106 can be any form of data storage device including, but not limited to, optical data storage, electrostatic data storage, electroresistive data storage, magnetic data storage, and/or molecular data storage devices. All or a portion of the non-transitory storage media 106 may be disposed within the at least one processor 104, for example in the form of a cache, registers, or similar non-transitory memory structure capable of storing data or machine-readable instructions executable by the at least one processor 104.

The at least one non-transitory storage media 106 can have any data storage capacity from about 1 megabyte (1 MB) to about 3 terabytes (3 TB). Two or more storage devices may be used to provide all or a portion of the non-transitory storage media 106. For example, in some embodiments, the non-transitory storage media 106 can include a non-removable portion including a non-transitory, electrostatic, volatile storage medium and a removable portion such as a Secure Digital (SD) card, a compact flash (CF) card, a Memory Stick, or a universal serial bus ("USB") storage device.

The at least one processor 104 can execute one or more machine readable instruction sets that are stored in whole or in part in the at least one non-transitory storage media 106. The machine executable instruction set(s) can include instructions related to basic functional aspects of the at least one processor 104, for example data transmission and storage protocols, communication protocols, input/output ("I/O") protocols, USB protocols, and the like. Machine executable instruction sets related to all or a portion of the dimensioning functionality of the volume dimensioning system 100 and intended for execution by the at least one processor 104 while in calibration or pre-run time mode, in run time mode, or combinations thereof may also be stored within the at least one non-transitory storage media 106, the at least one processor 104, or any combination thereof. Additional volume dimensioning system 100 functionality may also be stored in the form of machine executable instruction set(s) in the at least one non-transitory storage media 106. Such functionality may include system security settings, system configuration settings, language preferences, dimension and volume preferences, and the like.

Data is transferred between the at least one non-transitory storage media 106 and the at least one processor 104 via serial or parallel bi-directional data buses (not shown in FIG. 1A). The at least one processor 104 can include any device comprising one or more cores or independent central processing units that are capable of executing one or more machine executable instruction sets. The at least one processor 104 can, in some embodiments, include a general purpose processor such as a central processing unit ("CPU") including, but not limited to, an Intel®Atom® processor, an Intel® Pentium®, Celeron®, or Core 2® processor, and the like. In other embodiments the at least one processor 104 can include a system-on-chip ("SoC") architecture, including, but not limited to, the Intel® Atom® System on Chip ("Atom SoC") and the like. In other embodiments, at least one processor 104 can include a dedicated processor such as an application specific integrated circuit ("ASIC"), a programmable gate array ("PGA" or "FPGA"), a digital signal processor ("DSP"), or a reduced instruction set computer ("RISC") based processor. Where the volume dimensioning system 100 is a battery-powered portable system, the at least one processor 104 can include low power consumption processor(s), for example Intel® Pentium M®, or Celeron M® mobile system processors or the like, to extend the system battery life.

Figure 2A:
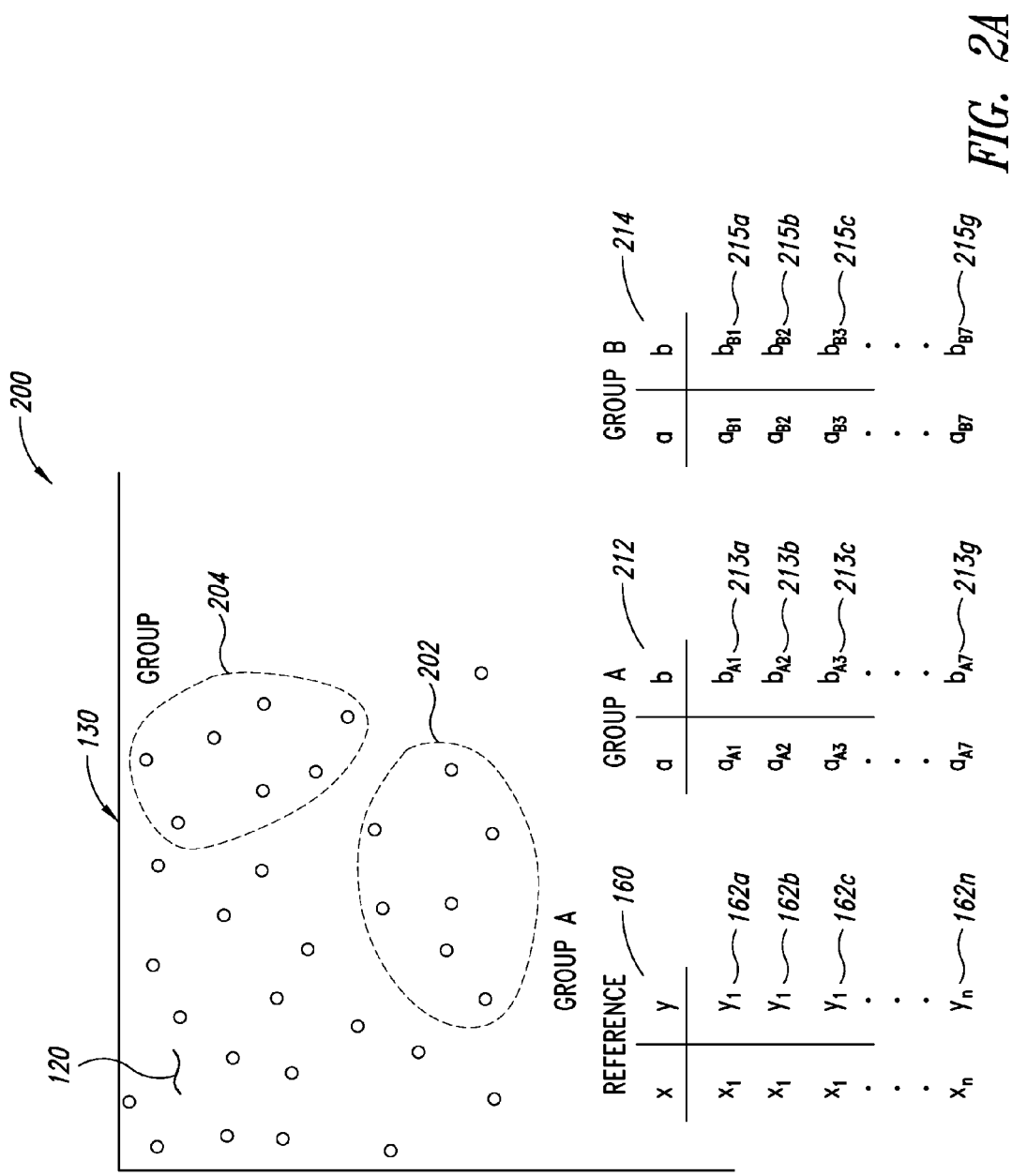
FIG. 2A is a schematic diagram of a portion of an example pattern of elements including two element groups, each containing a number of elements having a unique spatial relationship among the pattern of elements, and an ordered coordinate data list associated with each of the two client groups, according to one illustrated embodiment.

FIG. 2A shows two element groups 202 and 204, each including an seven (7) elements having a spatial geometry that is unique among all groups of seven elements in the element pattern 130, according to an illustrated embodiment. FIGS. 2B and 2C show the two element groups 202 and 204 disposed about points of interest associated with an object 150 in the three-dimensional space 120, according to an illustrated embodiment.

Numerical data representative of the Cartesian coordinates 213 corresponding to element locations in element group 202 is included in coordinate data list 212. Numerical data representative of the Cartesian coordinates 215 corresponding to element locations in element group 204 is included in coordinate data list 214.

Recall, the spatial geometry between the elements included in each of element groups 202 and 204 is unique in that no group of seven elements elsewhere in the element pattern 130 will have a similar spatial geometry. Thus, the numerical data representative of the element locations of the elements included in element group 202 and the numerical data representative of the element locations of the elements included in element group 204 will be unique within the element pattern 130. Identifying reference elements having coordinate data indicative of a spatial arrangement in the reference element pattern 140 corresponding to the numerical data representative of the element locations of the elements included in element group 202 or the numerical data representative of the element locations of the elements included in element group 204 is therefore sufficient to find corresponding coordinate location data for every element included in the acquired image data of the element pattern 130.

The elements included in element groups 202 and 204 may be manually selected by the system user or automatically selected by the at least one processor 104. In at least some instances, the volume dimensioning system user can manually select one or more element groups using the input device 114, such as by providing a touch input on a touchscreen input device 114. In other instances, the at least one processor 104 can select the elements included in each of the groups of elements. As shown in FIGS. 2B and 2C, at times, the element groups may include a number of points of interest 220 that are either manually identified by the system user or autonomously identified by the at least one processor 104. Such points of interest 220 may include surface features present on the object 150, such as corners of a cubic object 150 as depicted in FIGS. 2B and 2C.

After a number of element groups are either manually or autonomously identified, the machine executable instruction set can cause the at least one processor 104 to identify those elements within each of the respective element groups 202, 204 and extract the data indicative of the Cartesian coordinate 213, 215 locations of each of the elements within each of the respective element groups 202, 204 from the acquired image data provided by the image acquisition device 102. The at least one processor 104 can generate or otherwise form a number of coordinate data lists 212, 214, each containing numerical data indicative of the Cartesian coordinate locations 213, 215 of the elements included in each of the respective element groups 202, 204. In at least some instances the at least one processor 104 can sort the numerical data indicative of the Cartesian coordinate locations of the elements included in each of the respective coordinate data lists 212, 214.

The reference data list 160 can be searched against each of the respective coordinate data lists 212, 214 by the at least one processor to identify reference elements having locations corresponding to the locations of the elements included in each group. In at least some instances, the numerical data indicative of the Cartesian coordinates 162 of the reference elements in the reference element pattern 140 may be sorted by the at least one processor prior to performing the search against each of the coordinate data lists 212, 214.

The search performed by the at least one processor 104 can be performed using a top-down or bottom-up search strategy where the numerical data corresponding to the Cartesian coordinates 213, 215 of the elements included in each of the coordinate data lists 212, 214 are compared to the numerical data indicative of the Cartesian coordinates 162 of the reference elements in the reference element pattern 140.

In some instances, the search performed by the at least one processor 104 can be further streamlined by taking advantage of the fact that the elements included in each of the groups 202, 204 are in close geometric proximity. Since the numerical data indicative of the Cartesian coordinates 162 of the reference elements in the reference element pattern 140 is sorted, numerical data for those reference elements in close geometric proximity is usually found clumped or otherwise grouped within a smaller portion of the overall reference data list 160. By focusing the search for numerical data indicative of Cartesian coordinates 162 of reference elements corresponding to numerical data indicative of Cartesian coordinate locations 213, 215 of acquired elements included in each of the coordinate data lists 212, 214 on only portion of the reference data list 160, the overall burden on computing resources may be further reduced. For example, the numerical data indicative of Cartesian coordinate locations 213 of acquired elements included in coordinate data lists 212 can be used to initially search the reference data list 160 using a top-down or bottom-up search. However, once the Cartesian coordinates 162 of the first corresponding reference element are identified in the reference data list 160, the search continues not from the top or bottom of the reference data list 160, but instead from the identified corresponding reference element in the reference data list 162. The search can be performed upwardly, downwardly, or alternating upward and downward in the reference data list 160 from the identified corresponding reference element. For each subsequently identified reference element corresponding to an acquired element included in the coordinate data list 212, the at least one processor 104 can begin the search using an upward, downward or alternating upward and downward search of the reference data list 160 about the respective identified corresponding reference element.

Figure 3A:
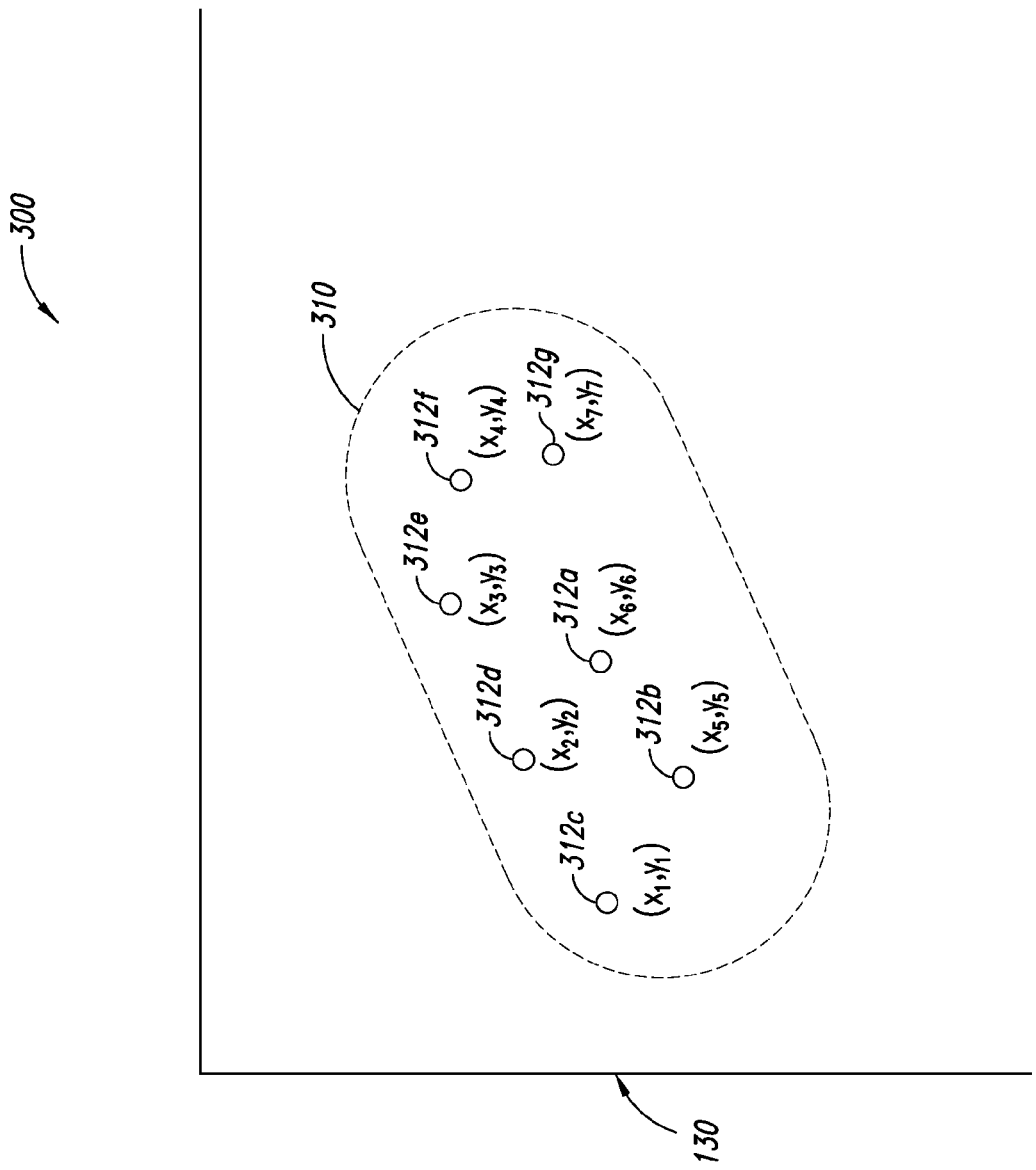
FIG. 3A is an enlarged view of a portion of an example pattern of elements projected into a three-dimensional space including Cartesian coordinate data associated with element locations in a group including a number of elements, according to one illustrated embodiment.
Figure 3B:
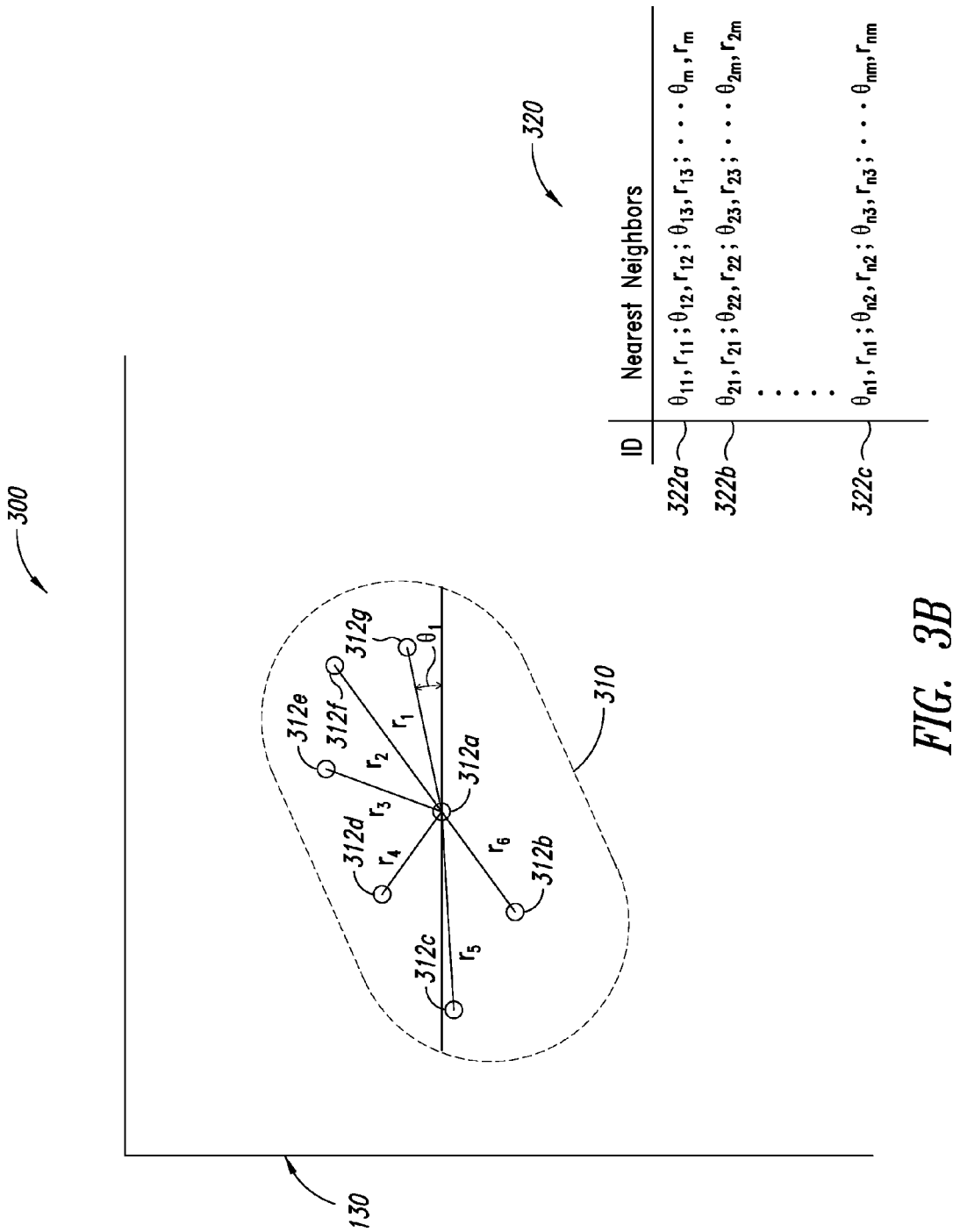
FIG. 3B is an image of a portion of the example pattern of elements shown in FIG. 3A projected into a three-dimensional space including locally-referenced coordinate data, according to one illustrated embodiment.

FIG. 3A shows an element group 310 that includes seven elements 312a-312g (collectively "acquired elements 312") in an acquired element pattern 130 where each of the elements 312 is identified using absolute coordinates in a system such as a Cartesian coordinate system, according to an illustrated embodiment. FIG. 3B shows the same element group 310 including the seven elements 312 in the acquired element pattern 130 where one of the elements (312a) is used to locally reference each of the other elements 312b-312g in the group using relative coordinates such as polar coordinates, according to an illustrated embodiment. Although a seven element group 310 is illustrated in FIGS. 3A and 3B, it should be understood by one of ordinary skill in the art that each element group 310 may contain a lesser or greater number of elements.

In some instances, the search performed by the at least one processor 104 can be further streamlined by converting the numerical data indicative of the Cartesian coordinates of the elements included in the element group 310 to a locally referenced coordinate system such as a polar coordinate system where a first element 312a in the group 310 is used to reference all of the other elements 312b -312g in group 310. In such instances, instead of including numerical data indicative of the Cartesian coordinates of the reference elements included in the reference element pattern 140 is converted to a reference data list 320 including locally-referenced numerical data 322a -322n (collectively "locally-referenced numerical data 322") indicative of the angle and distance to each of the "m" (where m=the number of elements included in each group−1) nearest reference element neighbors of a particular reference element. In some instances, the locally-referenced numerical data 322 may be included as a configuration parameter of the volume dimensioning system 100 at the time of manufacture, at the time of installation, at the time of start up, or periodically throughout the lifetime of the volume dimensioning system 100. In other instances, the numerical data included in a Cartesian coordinate based reference data list 160 may be numerically converted by the at least one processor 104 to locally-referenced numerical data 322 to provide the reference data list 320.

By converting the number of elements included in each group to a single string of locally-referenced coordinate data, the at least one processor 104 can search the reference data list 320 one time to find the reference element location corresponding to the location of the first element 312a used to reference all of the other elements in the group. However, since all of the other elements are locally-referenced in both the group 310 and in the reference data list 320, identifying the first element 312a also identifies every other element in the group 310. Thus, advantageously only a single search is performed to identify the seven reference elements corresponding to the seven elements included in the group 310.

Figure 4:
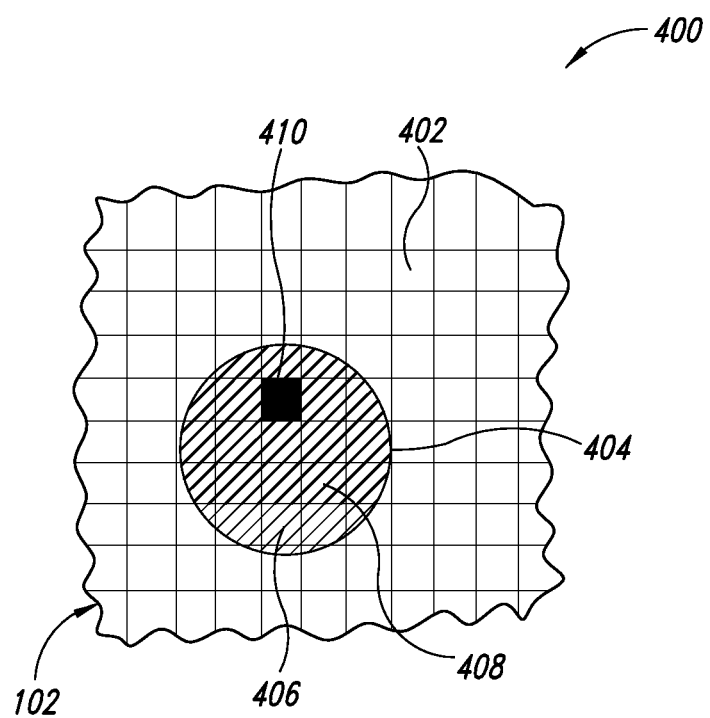
FIG. 4 is a schematic diagram of an illustrative element in an element pattern in which the element is formed using a number of pixels in the image acquisition device, each of the pixels having an associated grayscale value used to calculate the center of intensity of the element, according to one illustrated embodiment.

FIG. 4 shows a single element 404 detected by the image acquisition device 102 where the single element 404 provides a grayscale image covering a number of pixels 402 with varying degrees of intensity 406, 408, and 410, according to an illustrated embodiment. In at least some instances, determining a numerical value indicative of a "center of intensity" 410 of each element 404 included in the acquired element pattern 130 can improve the overall accuracy of dimensional and volumetric information determined by the volume dimensioning system 100 to a level well within established accuracy limits for trade and commerce. In at least some instances, prior to determining the coordinate location of each of the elements 404 in the acquired element pattern 130, the machine executable instructions can cause the at least one processor 106 to analyze each element 404 in the acquired element pattern 130 to determine a "center of intensity" for each of the elements. The determined "center of intensity" 410 can then be used by the at least one processor 104 to determine the numerical data indicative of the coordinate location for the respective element 404 with an enhanced level of accuracy. The numerical data indicative of the Cartesian coordinates 172 of the "center of intensity" for each element 404 in the acquired element pattern 130 may then be used by the at least one processor 104 to generate the coordinate data list 170.

In at least some implementations, the center of intensity may be numerically determined by the at least one processor 104 using any color, grayscale, or numerical averaging algorithm. One such numerical averaging algorithm is:

$$Xc = \frac{\sum_i w_i X_i}{\sum_i w_i}$$

$$Yc = \frac{\sum_i w_i Y_i}{\sum_i w_i}$$

Figure 5:
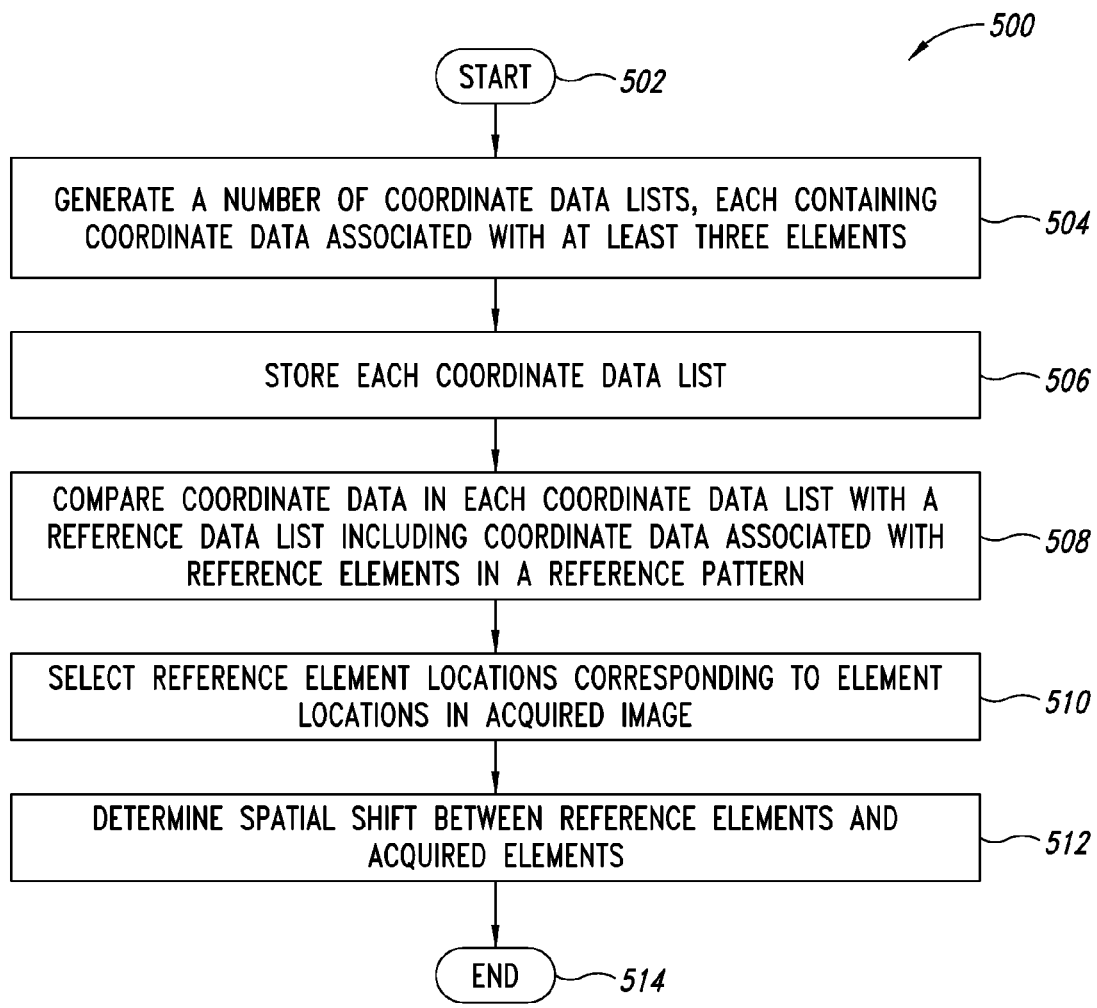
FIG. 5 is a high-level flow diagram of an example method of determining locations of each element in a pattern of elements included in an acquired image with locations of corresponding reference elements in the pattern of elements included in a reference image by numerically comparing a list of acquired element coordinate data with a list of reference element coordinate data, according to one illustrated embodiment.

Where: Xc=Center of intensity in X direction of element
Yc=Center of intensity in Y direction of element
$X_i$=X location of pixel forming element
$Y_i$=Y location of pixel forming element
$w_i$=Numerical grayscale weight of pixel FIG. 5 shows a high level method 500 of determining a spatial shift between an element pattern 130 and a reference element pattern 140 to enable the determination of a distance between the projection device 108 and each of the elements forming the acquired element pattern 130, according to an illustrated embodiment. The method 500 extracts numerical values corresponding to the Cartesian coordinate 172 locations for each of the elements in the element pattern 130 from an acquired image of a three-dimensional space 120 containing at least one object 150 to generate a coordinate data list 170. In some implementations, the numerical values in the coordinate data list 170 may optionally be sorted by the at least one processor 104 to provide an ordered coordinate data list 170. The numerical data representative of the element locations in each of the coordinate data lists 170 is compared against numerical data representative of the reference element location in a reference data list 160. The spatial shift between the elements in the acquired element pattern 130 and the reference element pattern 140 may be used to determine a distance from the projection device 108 generating the element pattern 130 to each of the respective elements. The determined distance to each element in the element pattern can be used to determine the volume dimension of objects 150 placed in the three-dimensional space 120. The comparison of numerical data representative of the element locations in each of the coordinate data lists 170 against numerical data representative of the reference element location in a reference data list 160 reduces the computing overhead requirements when compared to graphical search techniques, advantageously permitting the use of the volume dimensioning system 100 on portable electronic devices having limited computing resources. The method commences at 502.

At 504, responsive to receiving image data from the image acquisition device 102, the at least one processor 104 can extract data representative of each element in at least a portion of the element pattern 130 from the image data. The at least one processor 104 can further determine numerical values corresponding to the Cartesian coordinates of each element in the element pattern 130 from the data representative of each element extracted from the acquired image data. The at least one processor 104 can further generate a number of coordinate data lists 170. Each of the coordinate data lists 170 can include numerical data indicative of the Cartesian coordinate locations corresponding to at least three elements in the element pattern 130 as determined by the at least one processor 104 using the acquired image data obtained from the image acquisition device 102.

At 506, the at least one processor 104 can store each of the generated coordinate data lists 170 in a non-transitory storage medium. The non-transitory storage medium can include a non-transitory storage medium located in whole or in part within the at least one processor 104 or a dedicated non-transitory storage medium such as the non-transitory storage medium 106.

At 508, the at least one processor 104 can compare the numerical data indicative of the Cartesian coordinates 172 of each of the elements included in each of the coordinate data lists 170 with stored numerical data indicative of the Cartesian coordinates 162 of each of the reference elements included in a reference element pattern 140. The comparison between the numerical data in each of the coordinate data lists 170 and the numerical data in the reference data list 160 may be performed using a top-down, bottom-up, or similar search technique.

At 510, the at least one processor 104 can identify for each element included in each coordinate data list 170 a corresponding reference element included in the reference data list 160. In at least some instances, such identification may be based at least in part on the numerical data indicative of the Cartesian coordinate locations 172 of each of the elements and the numerical data indicative of the Cartesian coordinate locations 162 of each of the reference elements.

At 512, using the element correspondence determined at 510, the at least one processor can determine the spatial shift between each of the elements in the acquired element pattern 130 and the reference element pattern 140. The determined spatial shift between the acquired and corresponding reference elements may be used to subsequently determine the distance between the projection device 108 and each of the elements in the element pattern 130 as a preparatory step in volume dimensioning objects 150 placed in the three-dimensional space 120 within the field-of-view of the image acquisition device 102. The method concludes at 514.

Figure 6:
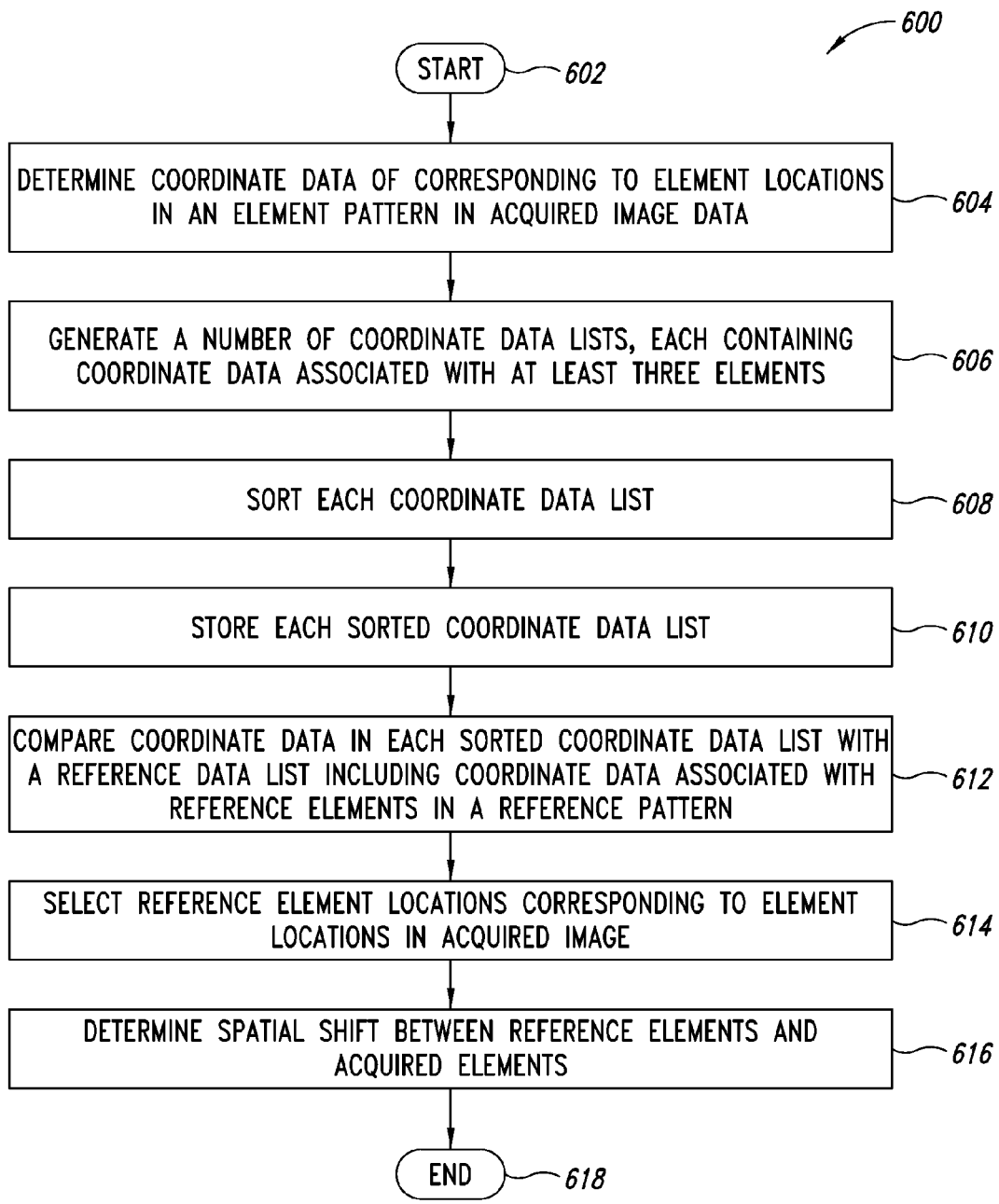
FIG. 6 is a high-level flow diagram of an example method of determining locations of a number of groups of elements, each group including a number of elements in a pattern of elements included in an acquired image with locations of corresponding reference elements in the pattern of elements included in a reference image by numerically comparing a list of acquired element coordinate data associated with the elements included in each group with a list of reference element coordinate data, according to one illustrated embodiment.

FIG. 6 shows a high level method 600 of determining a spatial shift between an element pattern 130 and a reference element pattern 140 to enable the determination of a distance between the projection device 108 and each of the elements forming the acquired element pattern 130 using a number of sorted coordinate data lists 170, according to an illustrated embodiment. The method 600 extracts numerical values corresponding to the Cartesian coordinate 172 locations for each of the elements in the element pattern 130 from an acquired image of a three-dimensional space 120 containing at least one object 150 to generate a number of coordinate data lists 170. The numerical values in each of the number of coordinate data lists 170 are sorted by the at least one processor 104 to provide a number of ordered coordinate data lists 170. Each of the number of ordered coordinate data lists 170 is compared against a reference data list 160 containing numerical values for the Cartesian coordinate locations 162 for each of the elements in a reference element pattern 140. In at least some instances, the numerical data contained in the reference data list 160 may also be sorted. The sorted coordinate data lists 170 and sorted reference data list 160 advantageously further reduce the search requirement since element groups often appear in close proximity within the reference data list 160. The spatial shift between the elements in the acquired element pattern 130 and the reference element pattern 140 may be used to determine a distance from the projection device 108 generating the element pattern 130 to each of the respective elements. The determined distance to each element in the element pattern can be used to determine the volume dimension of objects 150 placed in the three-dimensional space 120. The comparison of numerical data in the coordinate data list 170 with numerical data in the reference data list 160 reduces the computing overhead requirements when compared to graphical search techniques, advantageously permitting the use of the volume dimensioning system 100 on portable electronic devices having limited computing resources. The method commences at 602.

At 604, responsive to receiving image data from the image acquisition device 102, the at least one processor 104 can extract data representative of each element in at least a portion of the element pattern 130 from the image data. The at least one processor 104 can further determine numerical values corresponding to the Cartesian coordinates of each element in the element pattern 130 from the data representative of each element extracted from the acquired image data.

At 606, the at least one processor 104 generates a number of coordinate data lists 170. Each of the coordinate data lists 170 can include numerical data indicative of the Cartesian coordinate locations corresponding to an element group including at least three elements in the element pattern 130. The elements included in each element group may be manually determined by the system user or autonomously determined by the at least one processor 104. In at least some instances, some or all of the element groups may correspond to manually or autonomously identified points of interest within the acquired image data.

At 608, the at least one processor 104 can sort the numerical data included in each of the number of coordinate data lists 170 to provide a number of ordered coordinate data lists 170.

At 610, the at least one processor 104 can store each of the ordered coordinate data lists 170 in a non-transitory storage medium. The non-transitory storage medium can include a non-transitory storage medium located in whole or in part within the at least one processor 104 or a dedicated non-transitory storage medium such as the non-transitory storage medium 106.

At 612, the at least one processor 104 can compare the numerical data indicative of the Cartesian coordinates 172 of each of the elements included in each of the ordered coordinate data lists 170 with stored numerical data indicative of the Cartesian coordinates 162 of each of the reference elements included in a reference element pattern 140. The comparison between the numerical data corresponding to a first element in each of the coordinate data lists 170 and the numerical data in the reference data list 160 may be performed using a top-down, bottom-up, or similar search technique. In searches for subsequent elements included in each of the coordinate data lists 170, the at least one processor 104 can begin searching upward, downward, or alternating upward and downward from the reference element corresponding to the immediately previous element in the coordinate data list. For example, the at least one processor 104 may start at the bottom or the top of the reference data list 160 to perform the initial search of the reference data list 160 to identify a reference element corresponding to the first element in a coordinate data list 170. After the reference element corresponding to the first element in the coordinate data list 170 is identified, the at least one processor will begin the search of the reference data list 160 to identify a reference element corresponding to a second element in the coordinate data list 170 at the reference element corresponding to the first element in the coordinate data list 170. The search for the reference element corresponding to the second element in the coordinate data list 170 can be performed upwardly in the reference data list 160, downwardly in the reference data list 160, or alternating between upward and downward in the reference data list 160.

At 614, the at least one processor 104 can identify for each element included in each of the number of coordinate data lists 170 a corresponding reference element included in the reference data list 160. In at least some instances, such identification may be based at least in part on the numerical data indicative of the Cartesian coordinate locations 172 of each of the elements and the numerical data indicative of the Cartesian coordinate locations 162 of each of the reference elements.

At 616, using the element correspondence determined at 614, the at least one processor can determine the spatial shift between each of the elements in the acquired element pattern 130 and the reference element pattern 140. The determined spatial shift between the acquired and corresponding reference elements may be used to subsequently determine the distance between the projection device 108 and each of the elements in the element pattern 130 as a preparatory step in volume dimensioning objects 150 placed in the three-dimensional space 120 within the field-of-view of the image acquisition device 102. The method concludes at 618.

Figure 7:
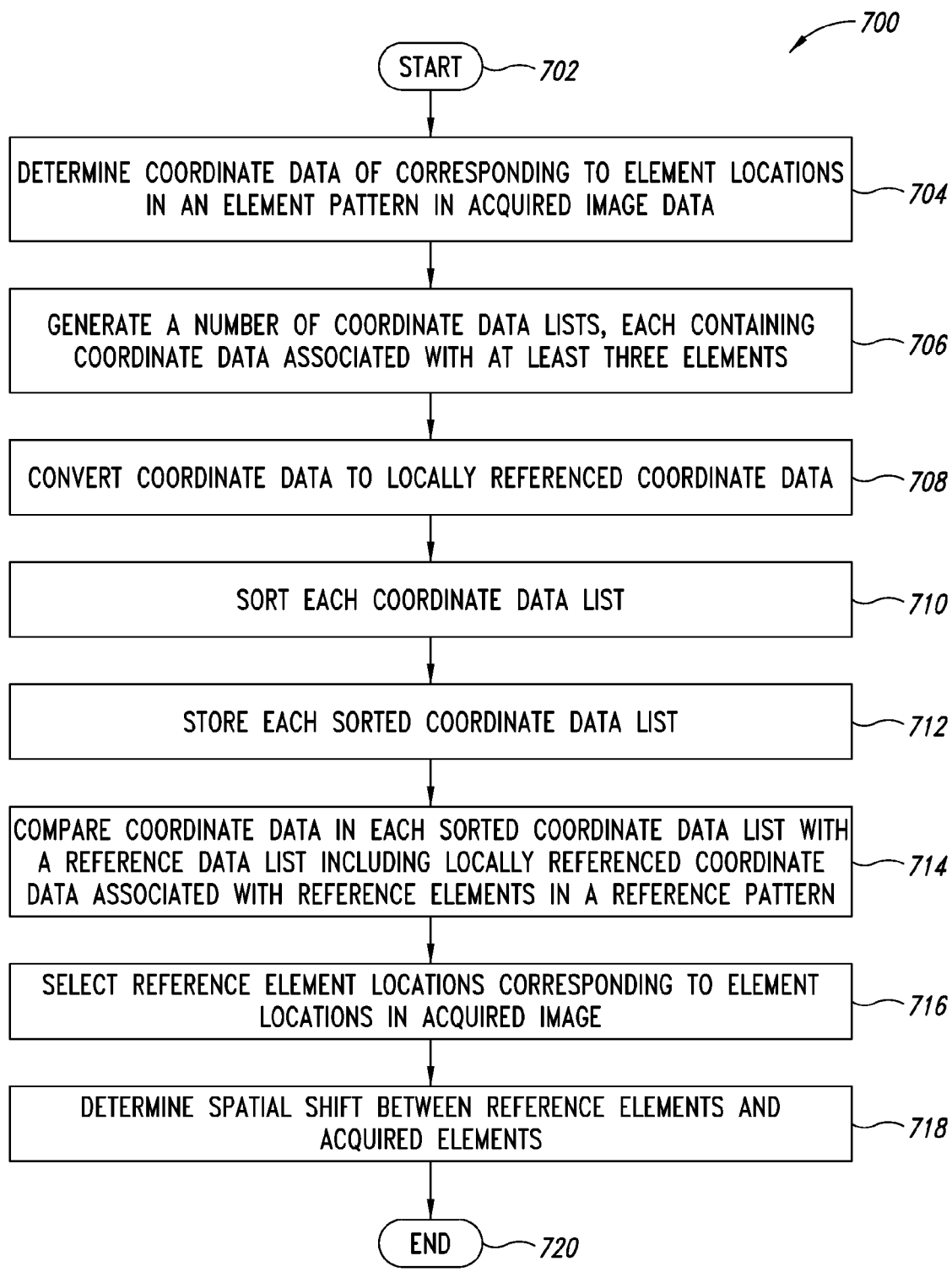
FIG. 7 is a high-level flow diagram of an example method of determining locations of a number of groups of elements, each group including a number of elements in a pattern of elements included in an acquired image with locations of corresponding reference elements in the pattern of elements included in a reference image by numerically comparing a list of locally-referenced acquired element coordinate data associated with the elements included in each group with a list of locally-referenced reference element coordinate data, according to one illustrated embodiment.

FIG. 7 shows a high level method 700 of determining a spatial shift between an element pattern 130 and a reference element pattern 140 to enable the determination of a distance between the projection device 108 and each of the elements forming the acquired element pattern 130 using a number of sorted, locally-referenced, coordinate data lists 170, according to an illustrated embodiment. The method 700 extracts numerical values corresponding to the Cartesian coordinate 172 locations for each of the elements in the element pattern 130 from an acquired image of a three-dimensional space 120 containing at least one object 150. Element groups including at least three elements are manually or autonomously identified and numerical data indicative of the Cartesian coordinates for each of the at least three elements included in each of the number of element groups are formed into a coordinate data list for the respective element group.

The numerical data indicative of the Cartesian coordinates for the at least three elements in each element group are then converted by the at least one processor 104 to numerical data indicative of a locally-referenced coordinate system where a first element in each element group is locally referenced to every other element included in the element group. Each of the number of coordinate data lists 170 is thus transformed into locally-referenced coordinate data list.

The numerical values in each of the number of locally-referenced coordinate data lists may be optionally sorted by the at least one processor 104 to provide a number of ordered, locally-referenced, coordinate data lists. Each of the number of locally referenced coordinate data lists is compared against a locally referenced reference data list 320. In at least some instances, the numerical data contained in the locally-referenced reference data list 320 may also be sorted. The locally-referenced coordinate data lists and locally-referenced reference data list 320 advantageously further reduce the search requirement since only a single search is needed to identify reference elements corresponding to all of the elements in an element group. The spatial shift between the elements in the acquired element pattern 130 and the reference element pattern 140 may be used to determine a distance from the projection device 108 generating the element pattern 130 to each of the respective elements. The determined distance to each element in the element pattern can be used to determine the volume dimension of objects 150 placed in the three-dimensional space 120. The comparison of numerical data in the locally-referenced coordinate data list with numerical data in the locally-referenced reference data list 320 further reduces the computing overhead requirements when compared to graphical search techniques, advantageously permitting the use of the volume dimensioning system 100 on portable electronic devices having limited computing resources. The method commences at 702.

At 704, responsive to receiving image data from the image acquisition device 102, the at least one processor 104 can extract data representative of each element in at least a portion of the element pattern 130 from the image data. The at least one processor 104 can further determine numerical values corresponding to the Cartesian coordinates of each element in the element pattern 130 from the data representative of each element extracted from the acquired image data.

At 706, the at least one processor 104 generates a number of coordinate data lists 170. Each of the coordinate data lists 170 can include numerical data indicative of the Cartesian coordinate locations corresponding to an element group including at least three elements in the element pattern 130. The elements included in each element group may be manually determined by the system user or autonomously determined by the at least one processor 104. In at least some instances, some or all of the element groups may correspond to manually or autonomously identified points of interest within the acquired image data.

At 708, the at least one processor 104 can convert the numerical data indicative of Cartesian coordinate locations for each of the elements included in the coordinate data list 170 associated with each element group to numerical data indicative of a locally-referenced coordinates for each of the elements included in the coordinate data list 170 associated with each element group. In at least one instance, a first element in each element group may be identified by the at least one processor 104 and each subsequent element included in the element group may be locally referenced to the identified first element using Polar coordinates (e.g., an angle and distance between the elements).

At 710, the at least one processor 104 may optionally sort the numerical data included in each of the number of locally-referenced coordinate data lists to provide a number of ordered, locally-referenced, coordinate data lists.

At 712, the at least one processor 104 can store each of the locally-referenced coordinate data lists in a non-transitory storage medium. The non-transitory storage medium can include a non-transitory storage medium located in whole or in part within the at least one processor 104 or a dedicated non-transitory storage medium such as the non-transitory storage medium 106.

At 714, the at least one processor 104 can compare the numerical data indicative of the locally-referenced coordinates of each of the elements included in each of the locally-referenced coordinate data lists with stored numerical data indicative of the locally-referenced coordinates 322 of each of the reference elements included in a locally-referenced reference data list 320. The comparison between the numerical data indicative of the locally-referenced coordinates of each of the elements included in each of the locally-referenced coordinate data lists and the locally-referenced reference data list 320 may be performed using a top-down, bottom-up, or similar search technique At 716, the at least one processor 104 can identify for each element included in each of the number of locally-referenced coordinate data lists a corresponding reference element included in the locally-referenced reference data list 320. In at least some instances, such identification may be based at least in part on the numerical data indicative of the locally-referenced coordinates of each of the elements included in the element group and the numerical data indicative of the locally-referenced coordinate locations 322 of each of the reference elements.

At 718, using the element correspondence determined at 716, the at least one processor 104 can determine the spatial shift between each of the elements in the acquired element pattern 130 and the reference element pattern 140. The determined spatial shift between the acquired and corresponding reference elements may be used to subsequently determine the distance between the projection device 108 and each of the elements in the element pattern 130 as a preparatory step in volume dimensioning objects 150 placed in the three-dimensional space 120 within the field-of-view of the image acquisition device 102. The method concludes at 720.

Figure 8:
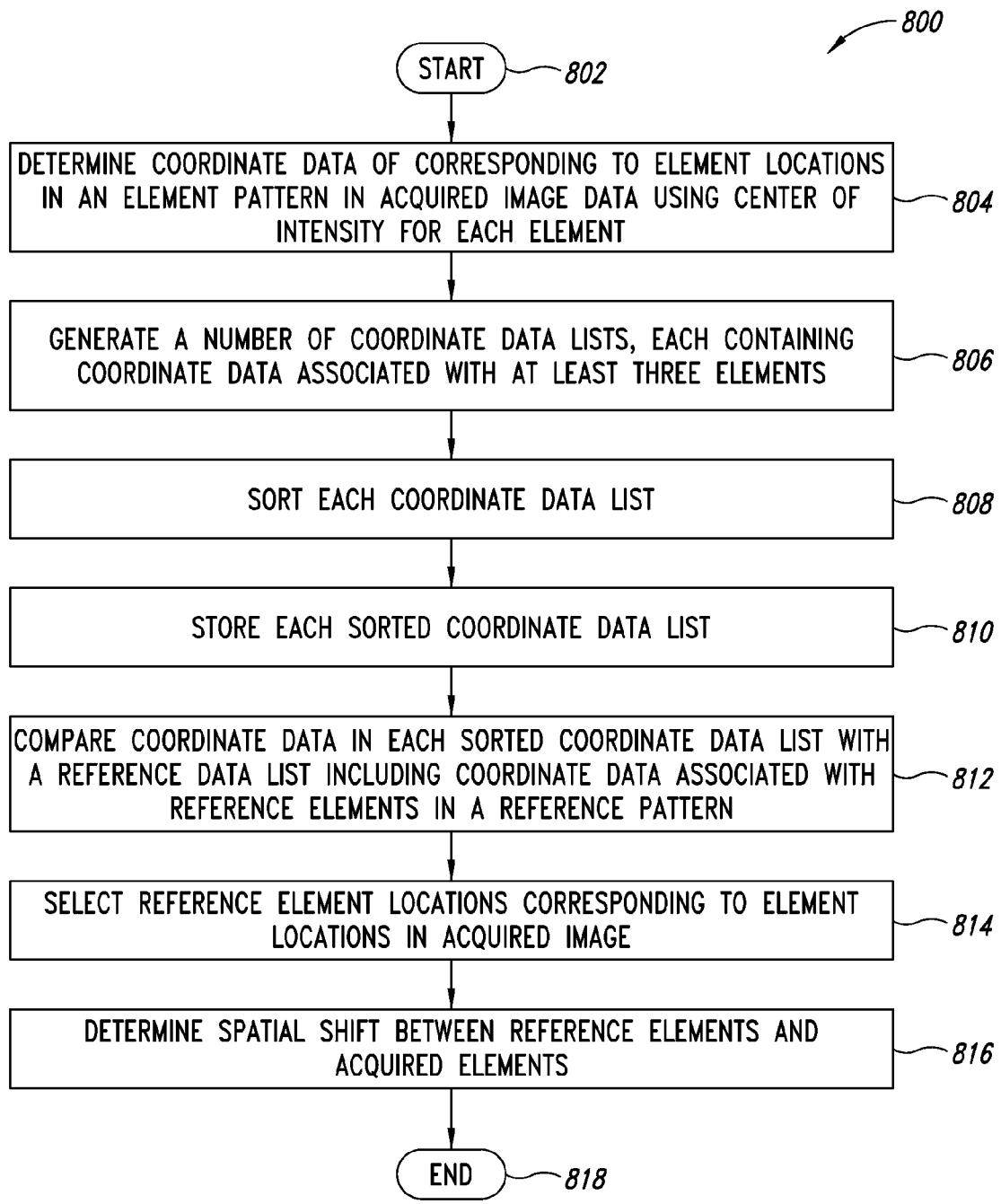
FIG. 8 is a high-level flow diagram of an example method of determining locations of each element in a pattern of elements included in an acquired image with locations of corresponding reference elements in the pattern of elements included in a reference image by numerically comparing a list of acquired element center of intensity coordinate data with a list of reference element coordinate data, according to one illustrated embodiment, according to one illustrated embodiment.

FIG. 8 shows a high level method 800 of determining with enhanced accuracy a spatial shift between an element pattern 130 and a reference element pattern 140 to enable the determination of a distance between the projection device 108 and each of the elements forming the acquired element pattern 130, according to an illustrated embodiment. The at least one processor 104 first determines a "center of intensity" 410 for each element included in the acquired element pattern 130. The determined center of intensity 410 is then used by the at least one processor 104 to extract numerical values of the Cartesian coordinate 172 locations for each of the elements in the element pattern 130 from an acquired image of a three-dimensional space 120 containing at least one object 150 to generate a coordinate data list 170. In some implementations, the numerical values in the coordinate data list 170 can be sorted by the at least one processor 104 to provide an ordered coordinate data list 170. The coordinate data list is compared against a reference data list 160 containing numerical values for the Cartesian coordinate locations 162 for each of the elements in a reference element pattern 140. The spatial shift between the elements in the acquired element pattern 130 and the reference element pattern 140 may be used to determine a distance from the projection device 108 generating the element pattern 130 to each of the respective elements. The determined distance to each element in the element pattern can be used to determine the volume dimension of objects 150 placed in the three-dimensional space 120. The comparison of numerical data in the coordinate data list 170 with numerical data in the reference data list 160 reduces the computing overhead requirements when compared to graphical search techniques, advantageously permitting the use of the volume dimensioning system 100 on portable electronic devices having limited computing resources. The method commences at 802.

At 804, responsive to receiving image data from the image acquisition device 102, the at least one processor 104 extract data representative of each element in at least a portion of the element pattern 130 from the acquired image data provided by an image acquisition device 102. The at least one processor 104 then determines a "center of intensity" 410 for each of the extracted elements. The at least one processor 104 can then determine numerical values corresponding to the Cartesian coordinates of the determined "center of intensity" 410 for each element in the element pattern 130 from the data representative of each element extracted from the acquired image data.

At 806, the at least one processor 104 generates a number of coordinate data lists 170. Each of the coordinate data lists 170 can include numerical data indicative of the Cartesian coordinate locations corresponding to at least three elements in the element pattern 130 as determined by the at least one processor 104 using the acquired image data obtained from the image acquisition device 102.

At 808, the at least one processor 104 can optionally sort the numerical data included in each of the number of coordinate data lists 170 to provide a number of ordered coordinate data lists 170.

At 810, the at least one processor 104 can store each of the ordered coordinate data lists 170 in a non-transitory storage medium. The non-transitory storage medium can include a non-transitory storage medium located in whole or in part within the at least one processor 104 or a dedicated non-transitory storage medium such as the non-transitory storage medium 106.

At 812, the at least one processor 104 can compare the numerical data indicative of the Cartesian coordinates 172 of each of the elements included in each of the ordered coordinate data lists 170 with stored numerical data indicative of the Cartesian coordinates 162 of each of the reference elements included in a reference element pattern 140. The comparison between the numerical data in each of the ordered coordinate data lists 170 and the numerical data in the reference data list 160 may be performed using a top-down, bottom-up, or similar search technique.

At 814, the at least one processor 104 can identify for each element included in each ordered coordinate data list 170 a corresponding reference element included in the reference data list 160. In at least some instances, such identification may be based at least in part on the numerical data indicative of the Cartesian coordinate locations 172 of each of the elements and the numerical data indicative of the Cartesian coordinate locations 162 of each of the reference elements.

At 816, using the element correspondence determined at 510, the at least one processor can determine the spatial shift between each of the elements in the acquired element pattern 130 and the reference element pattern 140. The determined spatial shift between the acquired and corresponding reference elements may be used to subsequently determine the distance between the projection device 108 and each of the elements in the element pattern 130 as a preparatory step in volume dimensioning objects 150 placed in the three-dimensional space 120 within the field-of-view of the image acquisition device 102. The method concludes at 818.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs) or programmable gate arrays. However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Various methods and/or algorithms have been described. Some or all of those methods and/or algorithms may omit some of the described acts or steps, include additional acts or steps, combine acts or steps, and/or may perform some acts or steps in a different order than described. Some of the method or algorithms may be implemented in software routines. Some of the software routines may be called from other software routines. Software routines may execute sequentially or concurrently, and may employ a multi-threaded approach.

In addition, those skilled in the art will appreciate that the mechanisms taught herein are capable of being distributed as a program product in a variety of forms, and that an illustrative embodiment applies equally regardless of the particular type of signal bearing non-transitory media used to actually carry out the distribution. Examples of non-transitory signal bearing media include, but are not limited to, the following: recordable type media such as portable disks and memory, hard disk drives, CD/DVD ROMs, digital tape, computer memory, and other non-transitory computer-readable storage media.

While discussed in terms of projection of dots, many of the techniques described herein could be employed in dimensioning systems that capture image data from objects which bear element patterns, for instance printed or otherwise inscribed on or in at least one surface of the object.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A portable structured light dimensioning system to determine a volume dimension of an object, comprising:
   an image acquisition device to acquire image data representative of at least an element pattern projected into a three-dimensional space that includes at least one object;
   at least one processor communicably coupled to the image acquisition device; and
   at least one non-transitory storage medium communicably coupled to the at least one processor and having stored therein at least one set of machine executable instructions that when executed by the at least one processor cause the at least one processor to:
      determine coordinate data associated with each element location in at least a portion of the element pattern present in the acquired image data;
      generate a number of coordinate data lists, each including coordinate data associated with at least three element locations in the acquired image data;
      for each coordinate data list:
         compare the coordinate data associated with each of the at least three element locations in the acquired image data with a reference data list including reference coordinate data associated with reference element locations in a reference element pattern; and
         select for each of the at least three element locations, a corresponding reference element location in the reference element pattern; and
         determine a spatial shift between the coordinate data associated with each of the at least three element locations in the acquired image data and the coordinate data associated with the respective corresponding reference element location in the reference element pattern.

2. The system of claim 1 wherein the machine executable instructions, when executed by the at least one processor, further cause the at least one processor to:

for each coordinate data list, compare the coordinate data associated with each of the at least three element locations in the acquired image data with a reference data list by performing for the coordinate data associated with each of the at least three element locations, at least one of: a top-to-bottom search, or, a bottom-to-top search of the reference data list to compare the coordinate data associated with the respective element location with coordinate data associated with each reference element location in the reference data list.

3. The system of claim 1 wherein the machine executable instructions, when executed by the at least one processor, further cause the processor to:

for each coordinate data list, sort the coordinate data using a defined sort pattern to provide a respective ordered coordinate data list.

4. The system of claim 3 wherein the machine executable instructions, when executed by the at least one processor, further cause the at least one processor to:

for each ordered coordinate data list perform at least one of a top-to-bottom search or a bottom-to-top search of the reference data list to compare the coordinate data associated with a first element location in the ordered coordinate data list with coordinate data associated with each reference element location in the reference data list; and for coordinate data in the ordered coordinate data list associated with each remaining element location, perform at least one of an upward search, a downward search, or an alternating upward/downward search about coordinate data associated with a reference element in the reference data list corresponding to coordinate data associated with an immediately preceding element location.

5. The system of claim 4 wherein the machine executable instructions, when executed by the at least one processor, further cause the at least one processor to:

for each ordered coordinate data list perform at least one of a top-to-bottom search or a bottom-to-top search of an ordered reference data list to compare the coordinate data associated with a first element location in the ordered coordinate data list with coordinate data associated with each reference element location in the ordered reference data list; and for coordinate data in the ordered coordinate data list associated with each remaining element location, perform at least one of an upward search, a downward search, or an alternating upward/downward search about coordinate data associated with a reference element in the ordered reference data list corresponding to coordinate data associated with an immediately preceding remaining element location.

6. The system of claim 3 wherein the machine executable instructions, when executed by the at least one processor, further cause the processor to:

generate an ordered coordinate data list about each of a number of points of interest in the acquired image data to provide the number of ordered coordinate data lists, each ordered coordinate data list including coordinate data associated with each of at least three element locations about each respective point of interest.

7. The system of claim 6 wherein the machine executable instructions, when executed by the at least one processor, further cause the at least one processor to:

accept a number of user inputs, each of the user inputs corresponding to one of the number of points of interest in the acquired image data.

8. The system of claim 6 wherein the machine executable instructions, when executed by the at least one processor, further cause the at least one processor to:

autonomously determine each of the number of points of interest in the acquired image data.

9. The system of claim 3 wherein the machine executable instructions, when executed by the at least one processor, further cause the processor to:

for each ordered coordinate data list, convert the coordinate data associated with the at least three element locations in the acquired image data to a second, locally-referenced coordinate system that relates the coordinate data associated a first of the at least three elements included the respective ordered coordinate data list to the coordinate data associated with each of the other of the at least three elements included in the respective ordered coordinate data list to provide a respective ordered, locally referenced, coordinate data list.

10. The system of claim 9 wherein the machine executable instructions, when executed by the at least one processor, further cause the at least one processor to:

for each ordered, locally referenced, coordinate data list perform at least one of a top-to-bottom search or a bottom-to-top search of a locally-referenced, reference data list in which the coordinate data associated with each reference element is related to coordinate data associated with a number of neighboring reference elements in the reference pattern, to compare the locally-referenced coordinate data associated with the first of the at least three elements in the ordered, locally-referenced, coordinate data list with coordinate data associated with each reference element location in the locally-referenced, reference data list.

11. The system of claim 1, further comprising wherein the machine executable instructions, when executed by the at least one processor, further cause the processor to:

determine a center of intensity of element locations in at least a portion of the element pattern present in the acquired image data; and determine coordinate data corresponding to the determined center of intensity of the element locations in at least a portion of the element pattern present in the acquired image data.

12. The system of claim 11, further comprising wherein the machine executable instructions, when executed by the at least one processor, further cause the processor to:

determine a center of intensity of element locations in at least a portion of the element pattern present in the acquired image data using grayscale values associated with each of the respective element locations.

13. The system of claim 1 wherein the machine executable instructions, when executed by the at least one processor, further cause the at least one processor to:

determine a respective distance between the image acquisition device and each of the elements in at least a portion of the pattern of elements incident upon the at least one object positioned in the three-dimensional space.

14. The system of claim 13 wherein the machine executable instructions, when executed by the at least one processor, further cause the at least one processor to:

determine a respective volume dimension associated with the at least one object using the determined respective distances between the image acquisition device and each of the elements in at least a portion of the pattern of elements incident upon the at least one object positioned in the three-dimensional space.

15. A structured light dimensioning method to determine a volume dimension of an object, comprising:

determining by at least one processor coordinate data corresponding to element locations in at least a portion of the element pattern present in acquired image data provided by at least one communicably coupled image capture device;

generating by the at least one processor a number of coordinate data lists, each coordinate data list including coordinate data associated with at least three element locations in the acquired image data;

storing each of the number of coordinate data lists in at least one non-transitory storage media communicably coupled to the at least one processor;

for each coordinate data list:

comparing by the at least one processor the coordinate data associated each of the at least three element locations in the acquired image data with a reference data list stored in at least one non-transitory storage media communicably coupled to the at least one processor, the reference data list including reference coordinate data associated with reference element locations in a reference element pattern;

selecting by the at least one processor, for each of the at least three element locations, a corresponding reference element location in the reference element pattern; and determining by the at least one processor a spatial shift between the coordinate data associated with each of the at least three element locations in the acquired image data and the coordinate data associated with the respective corresponding reference element location in the reference element pattern.

16. The method of claim 15 wherein comparing by the at least one processor the coordinate data associated each of the at least three element locations in the acquired image data with a reference data list comprises:

comparing by the at least one processor the coordinate data associated each of the at least three element locations in the acquired image data with a reference data list by performing for the coordinate data associated with each of the at least three element locations, at least one of a top-to-bottom search or a bottom-to-top search of the reference data list to compare the coordinate data associated with the respective element location with coordinate data associated with each reference element location in the reference data list.

17. The method of claim 15, further comprising:

for each coordinate data list, sorting by the at least one processor the coordinate data using a defined sort pattern to provide a respective ordered coordinate data list.

18. The method of claim 17, further comprising:

for each ordered coordinate data list, performing by the at least one processor at least one of a top-to-bottom search or a bottom-to-top search of the reference data list to compare the coordinate data associated with a first element location in the ordered coordinate data list with coordinate data associated with each reference element location in the reference data list; and for coordinate data in the ordered coordinate data list associated with each remaining element location, performing by the at least one processor at least one of an upward search, a downward search, or an alternating upward/downward search about coordinate data associated with a reference element in the reference data list corresponding to coordinate data associated with an immediately preceding element location.

19. The method of claim 17, further comprising:

for each ordered coordinate data list, performing by the at least one processor at least one of a top-to-bottom search or a bottom-to-top search of an ordered reference data list to compare the coordinate data associated with a first element location in the ordered coordinate data list with coordinate data associated with each reference element location in the ordered reference data list; and for coordinate data in the ordered coordinate data list associated with each remaining element location, performing by the at least one processor at least one of an upward search, a downward search, or an alternating upward/downward search about coordinate data associated with a reference element in the ordered reference data list corresponding to coordinate data associated with an immediately preceding remaining element location.

20. The method of claim 17 wherein generating by the at least one processor a number of coordinate data lists comprises:

generating by the at least one processor, an ordered coordinate data list proximate each of a number of points of interest in the acquired image data to provide the number of ordered coordinate data lists, each ordered coordinate data list including coordinate data associated with each of at least three element locations about each respective point of interest.

21. The method of claim 20, further comprising:

accepting by the at least one processor, a number of user inputs provided via at least one user interface communicably coupled to the at least one processor, each of the user inputs corresponding to one of the number of points of interest in the acquired image data.

22. The method of claim 20, further comprising:

autonomously determining by the at least one processor, each of the number of points of interest in the acquired image data.

23. The method of claim 17, further comprising:

for each ordered coordinate data list, converting by the at least one processor, the coordinate data associated with the at least three element locations in the acquired image data to a second, locally-referenced coordinate system that relates the coordinate data associated a first of the at least three elements included the respective ordered coordinate data list to the coordinate data associated with each of the other of the at least three elements included in the respective ordered coordinate data list to provide a respective ordered, locally referenced, coordinate data list.

24. The method of claim 23 wherein comparing by the at least one processor the coordinate data associated each of the at least three element locations in the acquired image data with the reference data list stored in at least one non-transitory storage media communicably coupled to the at least one processor comprises:

for each ordered, locally referenced, coordinate data list performing by the at least one processor at least one of a top-to-bottom search or a bottom-to-top search of a locally-referenced, reference data list in which the coordinate data associated with each reference element is related to coordinate data associated with a number of neighboring reference elements in the reference pattern, to compare the locally-referenced coordinate data associated with the first of the at least three elements in the ordered, locally-referenced, coordinate data list with coordinate data associated with each reference element location in the locally-referenced, reference data list.

25. The method of claim 15, further comprising:
   determining by the at least one processor a center of intensity of element locations in at least a portion of the element pattern present in the acquired image data.

26. The method of claim 25 wherein generating by the at least one processor a number of coordinate data lists, each coordinate data list including coordinate data associated with at least three element locations in the acquired image data comprises:
   generating by the at least one processor a number of coordinate data lists, each coordinate data list including coordinate data corresponding to the determined center of intensity of the at least three element locations in the acquired image data.

27. The method of claim 25 wherein determining by the at least one processor a center of intensity of element locations in at least a portion of the element pattern present in the acquired image data comprises:
   determining by the at least one processor the center of intensity of element locations in at least a portion of the element pattern present in the acquired image data using a number of grayscale values associated with each of the respective element locations.

28. The method of claim 15, further comprising:
   determining by the at least one processor a respective distance between the image acquisition device and each of the elements in at least a portion of the pattern of elements incident upon the at least one object positioned in the three-dimensional space.

29. The method of claim 28, further comprising:
   determining by the at least one processor a respective volume dimension associated with the at least one object using the determined respective distances between the image acquisition device and each of the elements in at least a portion of the pattern of elements incident upon the at least one object positioned in the three-dimensional space.

* * * * *